United States Patent
Horiuchi

(10) Patent No.: US 8,243,114 B2
(45) Date of Patent: Aug. 14, 2012

(54) IMAGE FORMING APPARATUS AND CONTROL METHOD THEREOF

(75) Inventor: Izuru Horiuchi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 592 days.

(21) Appl. No.: 12/389,130

(22) Filed: Feb. 19, 2009

(65) Prior Publication Data
US 2009/0214239 A1   Aug. 27, 2009

(30) Foreign Application Priority Data
Feb. 26, 2008   (JP) ................. 2008-045100

(51) Int. Cl.
*B41J 2/435* (2006.01)
*B41J 2/47* (2006.01)

(52) U.S. Cl. .............. 347/234; 347/229; 347/248

(58) Field of Classification Search .......... 347/229, 347/234, 248, 249
See application file for complete search history.

(56) References Cited

U.S. PATENT DOCUMENTS

| 5,402,409 A * | 3/1995 | Kataoka et al. | 369/124.07 |
| 6,529,643 B1 * | 3/2003 | Loce et al. | 382/300 |
| 7,630,100 B2 * | 12/2009 | Tojima et al. | 358/3.26 |

FOREIGN PATENT DOCUMENTS

| JP | 02-050176 A | 2/1990 |
| JP | 2003-182146 A | 7/2003 |
| JP | 2003-276235 A | 9/2003 |
| JP | 2005-304011 A | 10/2005 |

* cited by examiner

*Primary Examiner* — Hai C Pham
(74) *Attorney, Agent, or Firm* — Canon USA Inc IP Division

(57) ABSTRACT

An image forming apparatus includes a phase calculation portion, a pattern recognition portion, and a correction coefficient output portion. The phase calculation portion calculates a shift amount of the scanning lines as phase information and, from the phase information, outputs a first set of coefficients. The pattern recognition portion outputs a pattern concordance rate by performing pattern recognition on the group of pixels of interest and peripheral pixels thereof. The correction coefficient output portion outputs a second set of coefficients for correcting the first set of coefficients in accordance with the pattern concordance rate. An interpolation processing portion performs interpolation calculations by referring to the first set of coefficients, the second set of coefficients, and the pattern concordance rate.

8 Claims, 18 Drawing Sheets

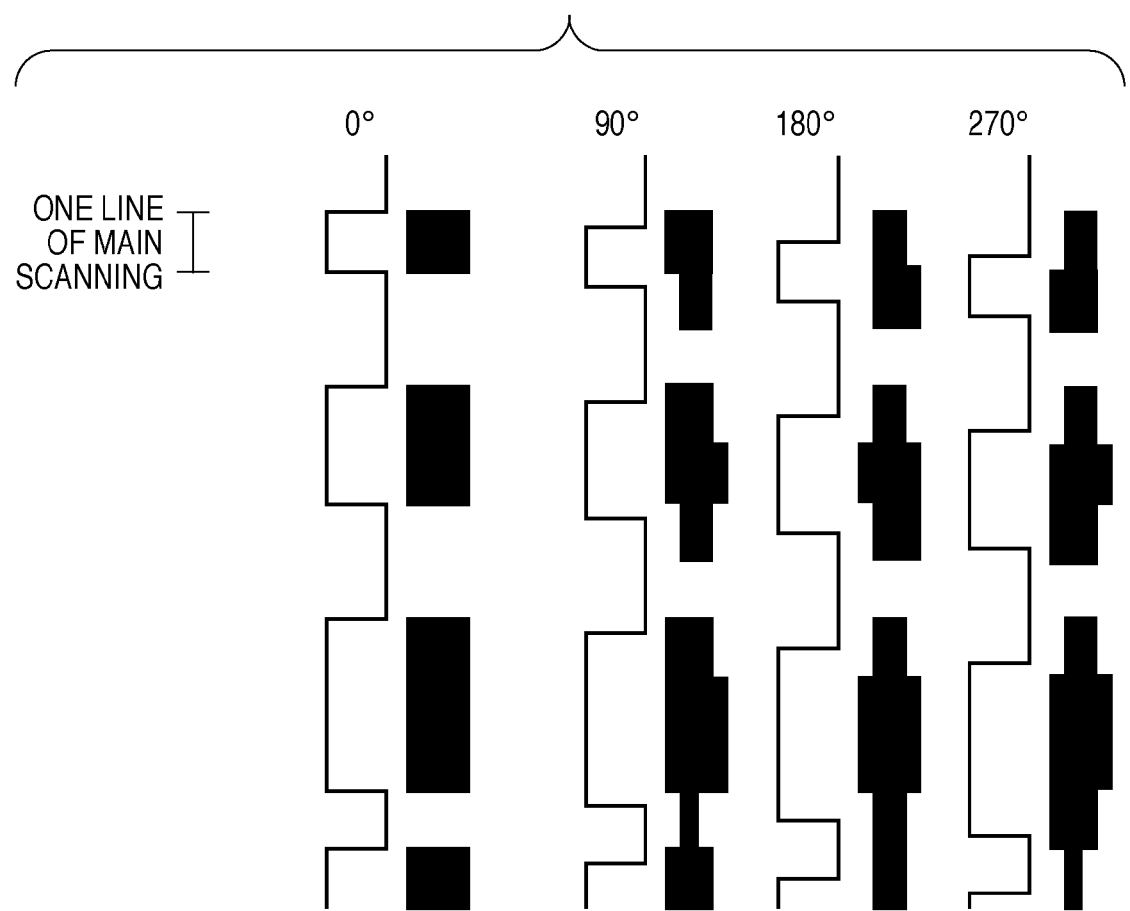
F I G. 15

IMAGE FORMING APPARATUS AND CONTROL METHOD THEREOF

BACKGROUND OF THE INVENTION

1. Field of the Invention

The present invention generally relates to image forming apparatuses and particularly relates to image forming apparatuses in which latent images are formed using a multi-beam system.

2. Description of the Related Art

There is a trend of greater importance being given to compactness in digital multifunction copiers, particularly in low-end products. Conventionally, oblique incidence type systems are known as optical systems for achieving compactness.

FIG. 16 is a lateral view showing one example of an oblique incidence type system. In FIG. 16, a light emitting device 1601 that outputs a beam for forming a latent image, a photosensitive drum 1603 for holding the latent image, and a polygonal mirror 1602 for scanning the beam are arranged in respectively different positions in a height direction. The beam output from the light emitting device 1601 is obliquely incident on mirror surfaces (scanning planes) arranged on lateral surfaces of the polygonal mirror 1601. It should be noted that numeral 1602' indicates an upper surface of the polygonal mirror 1602.

In oblique incidence type systems, distances from a center position (rotational axis) of the polygonal mirror 1602 to a center and an edge of the mirror surfaces are different (distances a and b). These differences in distance cause the position of the beam irradiated onto the photosensitive drum 1603 to fluctuate in the height direction.

FIG. 17 is a diagram for describing a difference between an actual scanning line formed on the photosensitive drum 1603 using an oblique incidence type system, and an ideal scanning line. A curved line indicated by a solid line 1701 is an actual scanning line. A straight line indicated by a dashed line 1702 is an ideal scanning line. In oblique incidence type systems, the scanning line suffers curvature in this manner.

A correction lens may be arranged on the beam path to mitigate the curvature. The correction lens is formed such that its refractive index to the height direction changes in response to the scanning position. Curvature is mitigated to a certain extent by the correction lens and high image quality is achieved.

However, in order to effectively mitigate curvature, it is necessary to take such measures as ensuring the processing accuracy of the correction lens and to regulate the optical system to a desired state. Since this incurs longer manufacturing times and increased manufacturing costs, such measures are unsuitable for low-end products.

In this regard, the same fluctuation as that in oblique incidence type systems can occur also in perpendicular incidence type systems in which the beam is caused to be incident perpendicularly with respect to the rotational axis of the polygonal mirror 1602. In an ideal perpendicular type system, the locus of the beam is present within the rotating plane of the polygonal mirror 1602.

FIG. 18A and FIG. 18B show single examples of an ideal optical system in which there is no significant shift in the rotational axis and an actual optical system in which there is significant shift in the rotational axis. FIG. 18A shows the ideal optical system. Since the rotational axis does not shift, even if the distance from the rotational axis to the reflection position on the mirror surface changes due to the rotation of the polygonal mirror 1602, the height of the irradiated point of the beam on the photosensitive drum 1603 is maintained uniformly. On the other hand, FIG. 18B shows how the rotational axis is arranged shifted out of position due to installation error. For this reason, the distance from the rotational axis to the reflection position on the mirror surface changes due to the rotation of the polygonal mirror 1602, and accompanying this, the height of the irradiated point also shifts undesirably. This shift is undesirable since it leads to a reduction in image quality. In high-end models in particular, installation error in the rotational axis is a problem that cannot be ignored.

FIG. 19 is a diagram showing one example of a method for correcting curvature due to line replacement. Here, description is given using FIG. 19 of a conventionally proposed correction method (Japanese Patent Laid-Open No. 02-050176, 2003-182146, 2003-276235 and 2005-304011). In FIG. 19, the dashed line indicates an ideal scanning locus L0. The solid lines are actual scanning loci L1, L2, and L3 respectively that pass within ±0.5 lines with respect to the ideal scanning locus.

Looking at both ends of the scanning loci, of the three scanning loci L1, L2, and L3, it is L1 that is closest to the ideal scanning locus L0. In scanning regions positioned in a central area of the scanning loci, it is L3 that is closest to the ideal scanning locus L0. And in regions positioned between the end portions and the central area, it is L2 that is closest to the ideal scanning locus L0. Accordingly, to achieve an ideal straight line, if different lines are replaced in a sub-scanning direction in order of L1=>L2=>L3=>L2=>L1 in response to the scanning region, then a substantially ideal straight line can be achieved. Dividing a single scanning period into multiple regions and forming a desired image by selecting an actual scanning line for each region in this manner is referred to here as line replacement. Furthermore, a juncture between one region and another region is referred to here as a replacement point.

Although a substantially ideal straight line can be achieved by employing the above-described method, a kind of stepping occurs near the replacement points. The stepping (jaggies) is a phenomenon that occurs originating in resolution roughness of the image data and insufficient gradations.

Smoothing processes have been put forth as a technique for hindering jaggies from becoming conspicuous. Smoothing processes are methods in which pixels near replacement points are extracted by pattern matching focusing on the fact that replacement points can be determined depending on only the formation of the image data, and these pixels are replaced by pixel data prepared in advance.

FIG. 20 is a block diagram of a smoothing process circuit according to related art. A line buffer 2001 is a buffer that temporarily stores pixel data targeted for pattern matching. A pattern matching portion 2002 is a block that compares several sets of pixel data outputted from the line buffer 2001 and predetermined patterns. A pixel conversion portion 2003 is a block that replaces pixel data in response to a result of pattern matching. It is desirable that patterns of 1:2, 1:3, 1:4, and 1:(5 or more) lines or edges or the like are used as the predetermined patterns. This is because these patterns are images that tend to be recognized visually as jaggies.

FIG. 21 is a diagram showing one example of patterns used in matching. Patterns 2101 and 2102 are 1:2 patterns. Patterns 2103 and 2104 are 1:3 patterns. The formation of replacement points is different in the patterns 2101 and 2102. Similarly, the formation of replacement points is different also in the patterns 2103 and 2104.

FIG. 22 is a diagram showing one example of pixel data that has been replaced by a smoothing process. Pixel data 2201 corresponds to the pattern 2101. Pixel data 2202 corresponds to the pattern 2102. Pixel data 2203 corresponds to the pattern 2103. And pixel data 2204 corresponds to the pattern 2104. As is evident from FIG. 22, the darkness of pixels is changed near the replacement points. This hinders stepping from becoming visually conspicuous.

Incidentally, the method for correcting curvature of scanning lines shown in FIG. 19 is one type of interpolation process in the sub-scanning direction. However, shifting microscopic phases (dot forming positions in the sub-scanning direction) using interpolation is a highly difficult technique in terms of electrophotographic characteristics. In low-end products in particular, there is a tendency for uniformity in fine line thickness to be impaired easily due to poor tone reproducibility of very small dots.

FIG. 23 is a diagram for describing the difficulty of maintaining uniformity in the thickness of fine lines. The rectangles in FIG. 23 indicate single dots of PWM (pulse width modulation). Numeral 2301 indicates an ideal single dot width of a fine line. Numeral 2302 indicates one example of a line for which replacement has been applied. Due to replacement, it has become a fine line in which jaggies are conspicuous. Numeral 2303 indicates one example of a line for which a smoothing process has been executed to reduce the jaggies. It should be noted that the accuracy for reproducing very small dots greatly affects the image quality for the line 2303. Numeral 2304 indicates one example of a line for which a smoothing process has been executed to reduce the jaggies. In particular, since the reproducibility of very small dots is insufficient for the line 2304, added dots for smoothing around the replacement points are lost. This is undesirable since fine lines become blurred or too thin. Numeral 2305 indicates one example of a line for which a smoothing process has been executed to reduce the jaggies. In particular, since the reproducibility of very small dots is insufficient for the line 2305, added dots become undesirably fatter than the desired width. This is undesirable since fine lines appear fatter than the intended width.

SUMMARY OF THE INVENTION

Accordingly, an aspect of the present invention is to provide a solution for at least one issue among these and other issues. For example, an aspect of the present invention is to perform correction on the curvature of scanning lines while maintaining the uniformity of fine lines by correcting shifts within a single line that can occur due to the correction.

An image forming apparatus according to the present invention includes, for example, an image carrier that carries an electrostatic latent image formed by irradiated light from a light emitting device. Further still, the image forming apparatus includes a main scanning portion that scans the irradiated light in a main scanning direction of the image carrier, and a sub-scanning portion that causes a light-receiving surface of the image carrier to move in a sub-scanning direction. Further still, the image forming apparatus includes an irradiated point adjustment portion that adjusts an irradiated point of the irradiated light in the sub-scanning direction so as to correct shift in scanning lines by the irradiated light, which can occur in the sub-scanning direction, and an interpolation processing portion that, after the irradiated points of the irradiated light have been adjusted, outputs interpolated pixel data by performing interpolation calculations on pixel data of a group of pixels of interest constituted by one or more pixels. In particular, the image forming apparatus includes a phase calculation portion, a pattern recognition portion, and a correction coefficient output portion. The phase calculation portion calculates a shift amount of the scanning lines as phase information and, from the calculated phase information, determines and outputs a first set of coefficients. The pattern recognition portion outputs a pattern recognition rate obtained by performing pattern recognition on a group of pixels of interest and peripheral pixels thereof. The correction coefficient output portion outputs the second set of coefficients to correct the first set of coefficients in accordance with a pattern recognition rate. Then, the interpolation processing portion executes interpolation calculations by referring to the first set of coefficients, the second set of coefficients, and the pattern recognition rate.

Further features of the present invention will become apparent from the following description of exemplary embodiments (with reference to the attached drawings).

BRIEF DESCRIPTION OF THE DRAWINGS

FIG. 15 is a diagram showing one example of PWM signals that have undergone interpolation processing.

DETAILED DESCRIPTION OF THE EMBODIMENTS

An embodiment of the present invention is shown below. Of course, each of the separate embodiments to be described below will be useful in understanding various concepts of the present invention. Furthermore, the technical scope of the present invention is to be established by the claims and not limited by the following separate embodiments.

Figure 1:
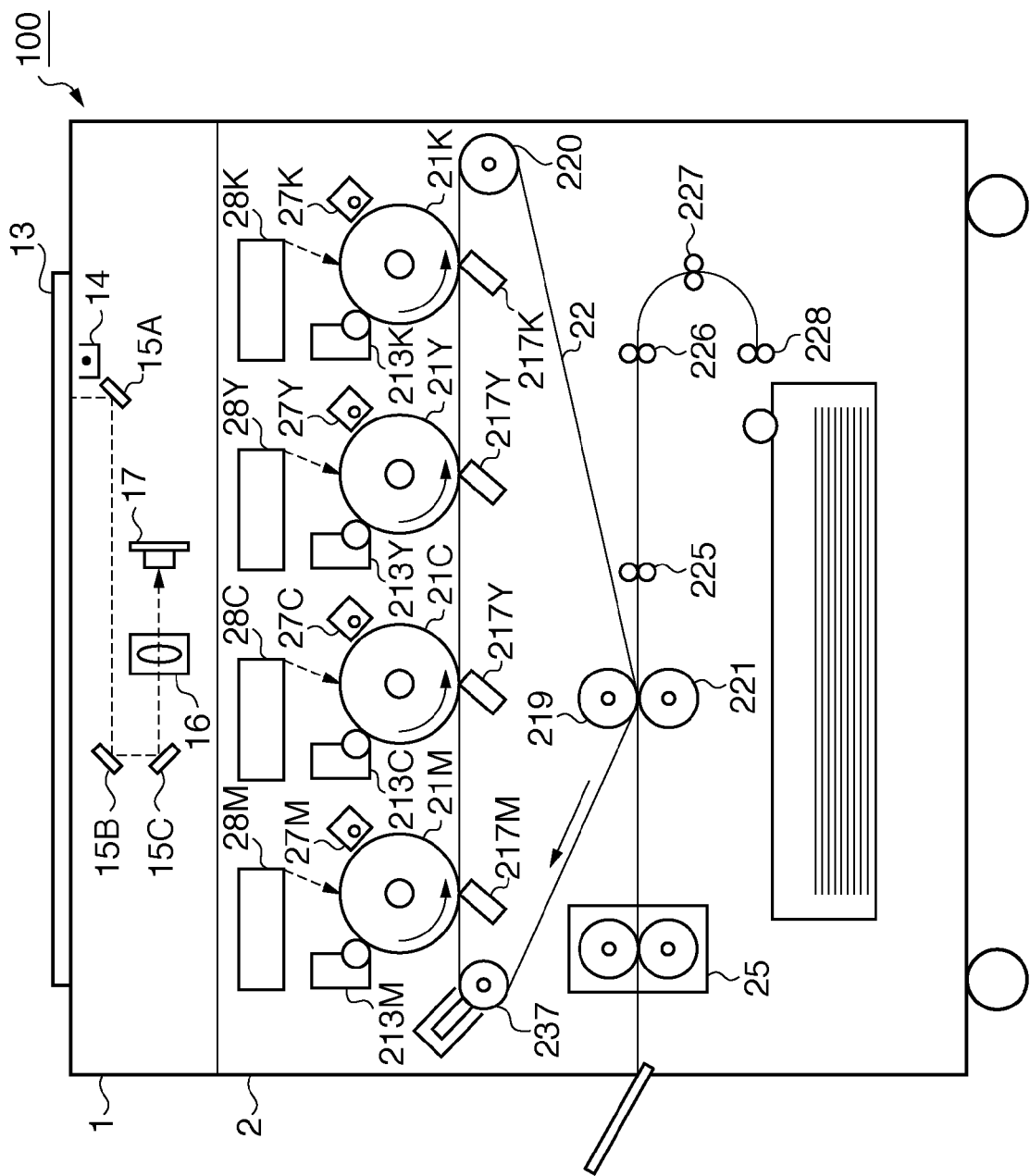
FIG. 1 is an outline cross-sectional view of an image forming apparatus in which a multicolor image is formed by superimposing a plurality of colors according to the present embodiment.

FIG. 1 is an outline cross-sectional view of an image forming apparatus in which a multicolor image is formed by superimposing a plurality of colors according to the present embodiment. This image forming apparatus is shown as a color copier having a four drum system in which four photosensitive members are arranged in tandem. It should be noted that the image forming apparatus may be also realized as a printing apparatus, a printer, a multi-function peripheral, or a facsimile machine for example. Furthermore, it is sufficient for the number of colors to be two or more. Accordingly, it is also sufficient for there to be two or more photosensitive members. Hereinafter, overall description is given regarding a color image reader device (hereinafter referred to as "color scanner") 1 and a color image recording device (hereinafter referred to as "color printer") 2, which here constitute a color copier 100.

Via a lighting lamp 14, a group of mirrors 15A, 15B, and 15C, and a lens 16, the color scanner 1 forms an image of an original 13 on a color sensor 17. Further still, the color scanner 1 reads color image information of the original for each light color-separated, for example blue (hereinafter referred to as B), green (hereinafter referred to as G), and red (hereinafter referred to as R), and converts these into electrical image signals.

Based on an intensity level of the image signals for each of B, G, and R, the color scanner 1 carries out color conversion processing. In this way, color image data of black (K), cyan (C), magenta (M), and yellow (Y) are obtained.

Next, description is given regarding the color printer 2. A single optical writing unit is provided separately for each of the colors of toner, these optical writing units being denoted as 28M (for magenta), 28Y (for yellow), 28C (for cyan), and 28K (for black). It should be noted that the suffixes M, Y, C, and K assigned to the reference numerals indicate the toner color. These optical writing units are an example of a scanning portion for each color that scan a corresponding image carrier by using, for each color, a beam modulated according to pixel data read out from a storage unit. The optical writing units may also be referred to as exposure devices or scanner devices.

Each optical writing unit carries out optical writing by converting color image data from the color scanner 1 into optical signals. In this way, an electrostatic latent image is formed on each of the photosensitive members 21M, 21Y, 21C, and 21K that are provided for each color. These photosensitive members are an example of image carriers that carry an electrostatic latent image formed by irradiated light from a light emitting device. It should be noted that the irradiated light is controlled in the sub-scanning direction by the photosensitive members themselves being rotated during the forming of the latent image. Accordingly, the photosensitive members are an example of a sub-scanning portion in which a light-receiving surface of the image carrier is caused to move in the sub-scanning direction.

The photosensitive members 21M, 21Y, 21C, and 21K are rotated counterclockwise as indicated by the arrows. Chargers 27M, 27Y, 27C, and 27K for uniformly charging the photosensitive members are arranged peripherally to the photosensitive members. Furthermore, an M developing device 213M, a C developing device 213C, a Y developing device 213Y, and a Bk developing device 213K are also arranged for developing the electrostatic latent images using a developing agent (for example, toner). Furthermore, an intermediate transfer belt 22 is arranged as an intermediate transfer member spanning a drive roller 220 and idler rollers 219 and 237. It should be noted that first transfer biasing blades 217M, 217Y, 217C, and 217K, which are first transfer portions, are also provided so as to face each of the photosensitive members.

A second transfer biasing roller 221 is arranged in a position in opposition to the idler roller 219. The second transfer biasing roller 221 is moved apart from and brought in contact with the intermediate transfer belt 22 by a disjunction mechanism not shown in the diagram.

In the color printer 2, image forming commences with magenta first. After this, forming of a cyan image commences with a delayed timing with respect to the rotation velocity of the intermediate transfer belt 22 in correspondence with a distance of separation between the photosensitive member 21M and the photosensitive member 21C. Next, forming of a yellow image commences with a delayed timing with respect to the rotation velocity of the intermediate transfer belt 22 in correspondence with a distance of separation between the photosensitive member 21C and the photosensitive member 21Y. Finally, forming of a black image commences with a delayed timing with respect to the rotation velocity of the intermediate transfer belt 22 in correspondence with a distance of separation between the photosensitive member 21Y and a position of the photosensitive member 21K. In this way, a multicolor image is formed on the intermediate transfer belt 22 in which an image of developing agent of each color is superimposed. This multicolor image is transferred to a recording material, which has been transported in by transport rollers 228, 227, 226, and 225, at a secondary transfer position formed between the idler roller 219 and the second transfer biasing roller 221. After this, the color image undergoes a process of being fixed to a front surface of the recording material in a fixing device 25. It should be noted that the recording material may also be referred to as recording media, paper, sheets, transfer material, and transfer paper for example.

Figure 2A:
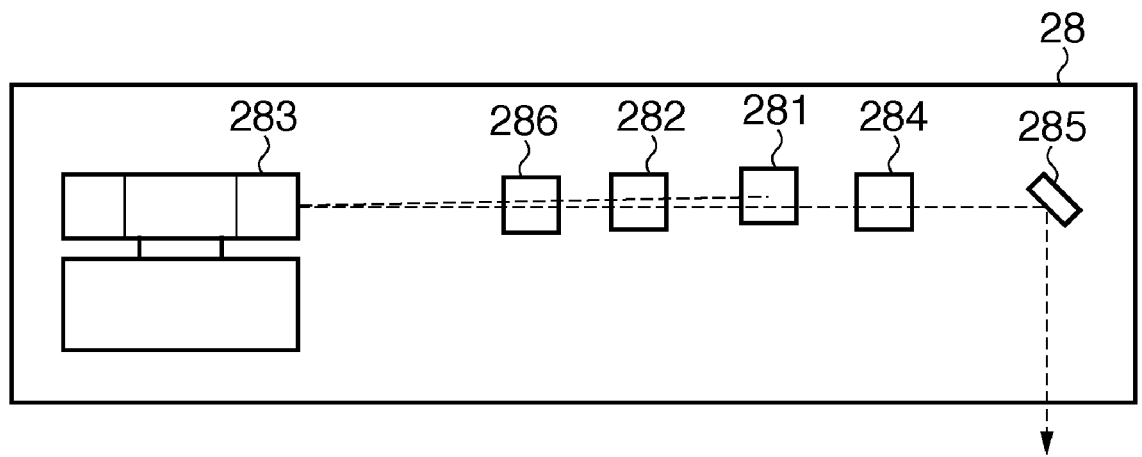
FIG. 2A is an outline cross-sectional view of an optical writing unit according to the present embodiment.
Figure 2B:
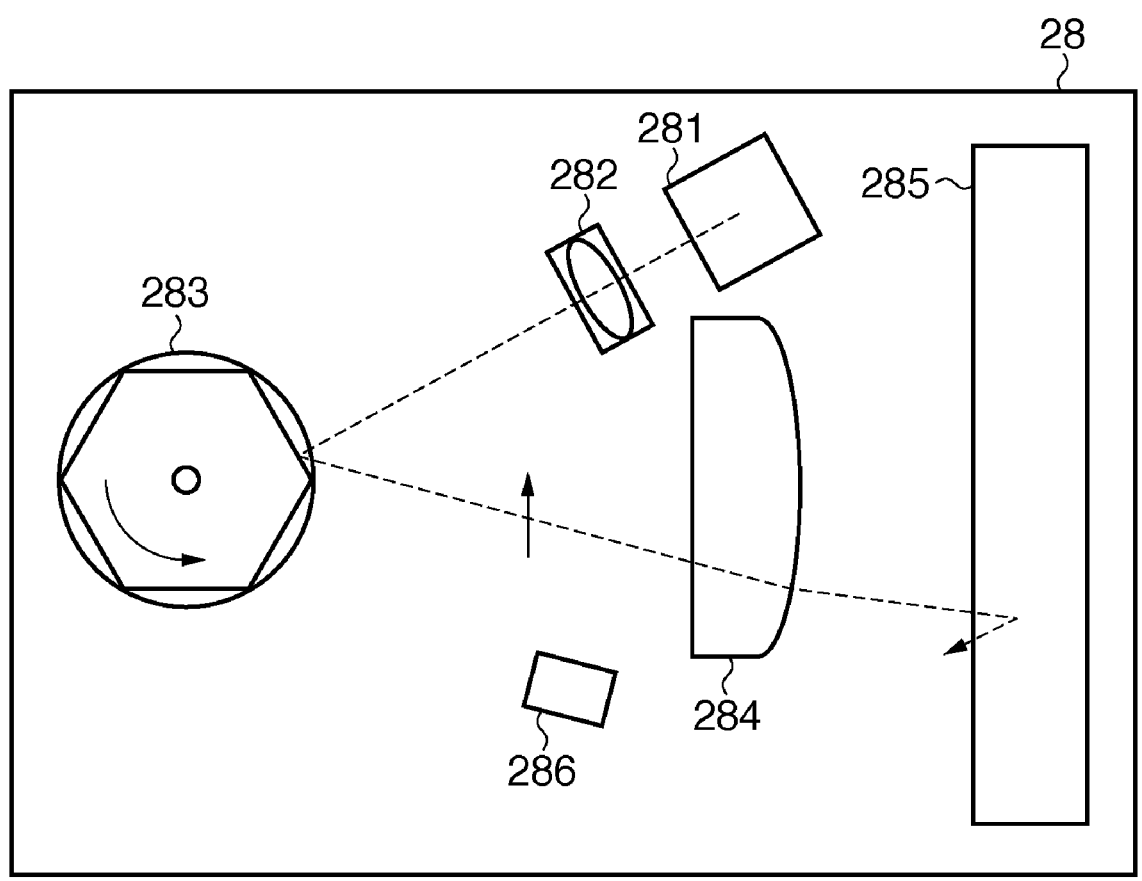
FIG. 2B is an outline top view of an optical writing unit according to the present embodiment.

FIG. 2A is an outline cross-sectional view of an optical writing unit according to the present embodiment. FIG. 2B is an outline top view of an optical writing unit according to the present embodiment. A light emitting device array 281 is provided with four light emitting devices and is capable of irradiating four beams (of laser light) simultaneously. The light emitting device array 281 is one example of a light emitting device unit having an M number of light emitting devices for forming an image.

Each of the beams is irradiated via a lens 282 onto a mirror surface of a polygonal mirror 283 that rotates. The polygonal mirror 283 is rotationally driven by a polygon motor. When the polygonal mirror 283 rotates one time, a photosensitive member can be scanned six times. This is because the polygonal mirror 283 is provided with six mirror surfaces. A beam that has been deflected by the polygonal mirror 283 is first detected by a BD device 286. BD is an abbreviation of beam detecting. A BD signal output from the BD device 286 is a trigger for commencing exposure in each main scan. That is, the data of pixels included in four corresponding lines is read out successively and applied to the four light emitting devices respectively. A scanning speed is corrected by an f-theta lens 284 such that the scanning speed of the beam on the photosensitive member will become constant. After this, the beam is deflected by a flat mirror 285 so as to expose and scan the photosensitive member.

Figure 3:
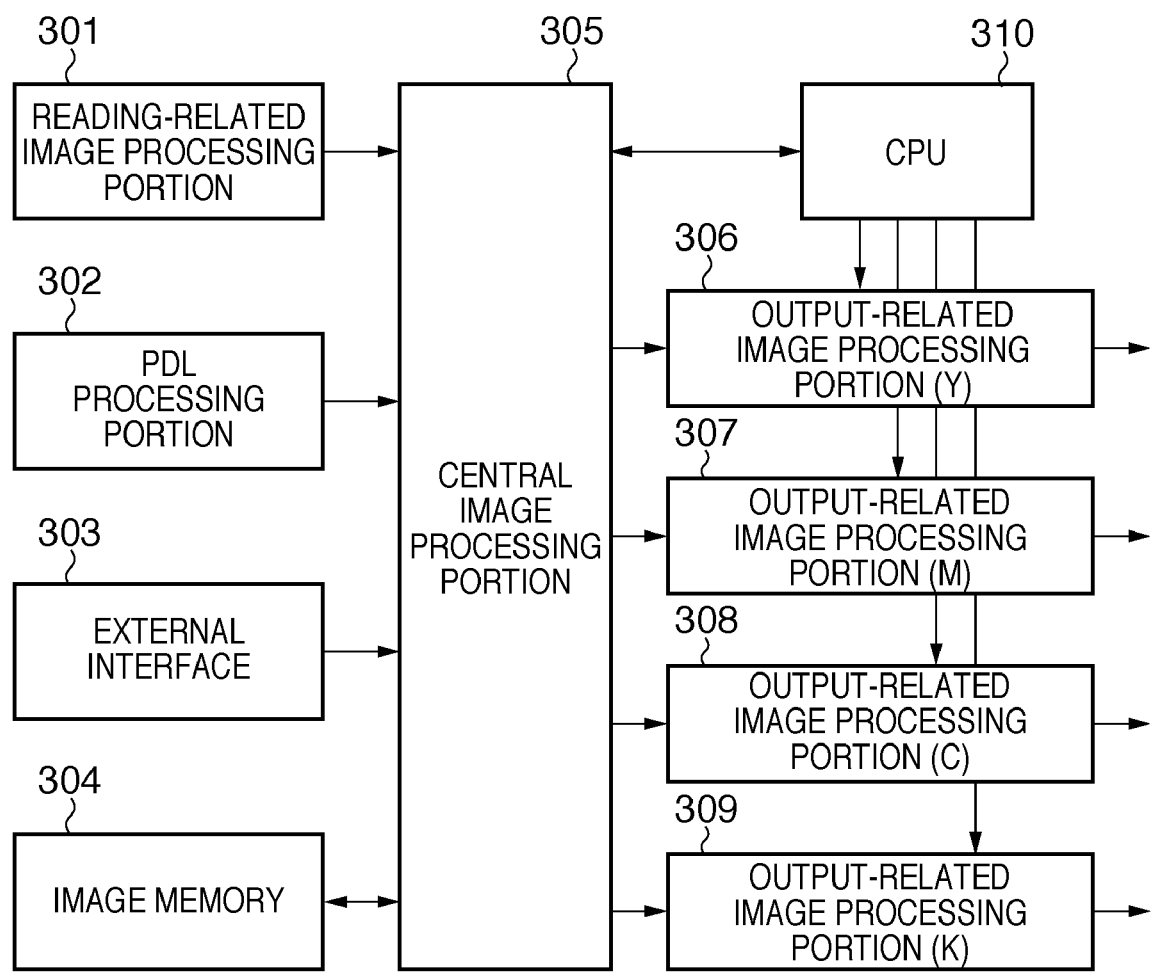
FIG. 3 is an illustrative block diagram regarding a control system and an image processing system according to the present embodiment.

FIG. 3 is an illustrative block diagram regarding a control system and an image processing system according to the present embodiment. A reading-related image processing portion 301 applies image processing such as shading correction for example on image signals outputted from the color scanner 1 and passes these signals onto a central image processing portion 305. The central image processing portion 305 stores the image signals in an image memory 304 and then passes on the image signals to output-related image processing portions 306 to 309 with appropriate timings reflecting the distances between the photosensitive members. The output-related image processing portion 306 is an image processing portion for yellow (Y). The output-related image processing portion 307 is an image processing portion for magenta (M). The output-related image processing portion 308 is an image processing portion for cyan (C). The output-related image processing portion 309 is an image processing portion for black (K).

The output-related image processing portions 306 to 309 execute correction processing and interpolation processing in accordance with the colors Y, M, C, and K respectively. In particular, the output-related image processing portions 306 to 309 adjust the irradiated points of the laser light in the sub-scanning direction for the input image data and keep the irradiated points of the irradiated light within a range of error in the sub-scanning direction. In this way, shifts in the scanning lines of the irradiated light that can occur in the sub-scanning direction are corrected. Accordingly, the output-related image processing portions 306 to 309 are one example of irradiated point adjustment portions that adjust the irradiated points of the irradiated light in the sub-scanning direction. The irradiated points of the irradiated light are achieved by the aforementioned line replacement for example.

The central image processing portion 305 exchanges data via an external interface 303 connected to a telephone line or a network or the like. If received data is described in a PDL (page description language), then a PDL processing portion 302 expands this into image information. A CPU 310 is a control device that processes each portion collectively.

Figure 4:
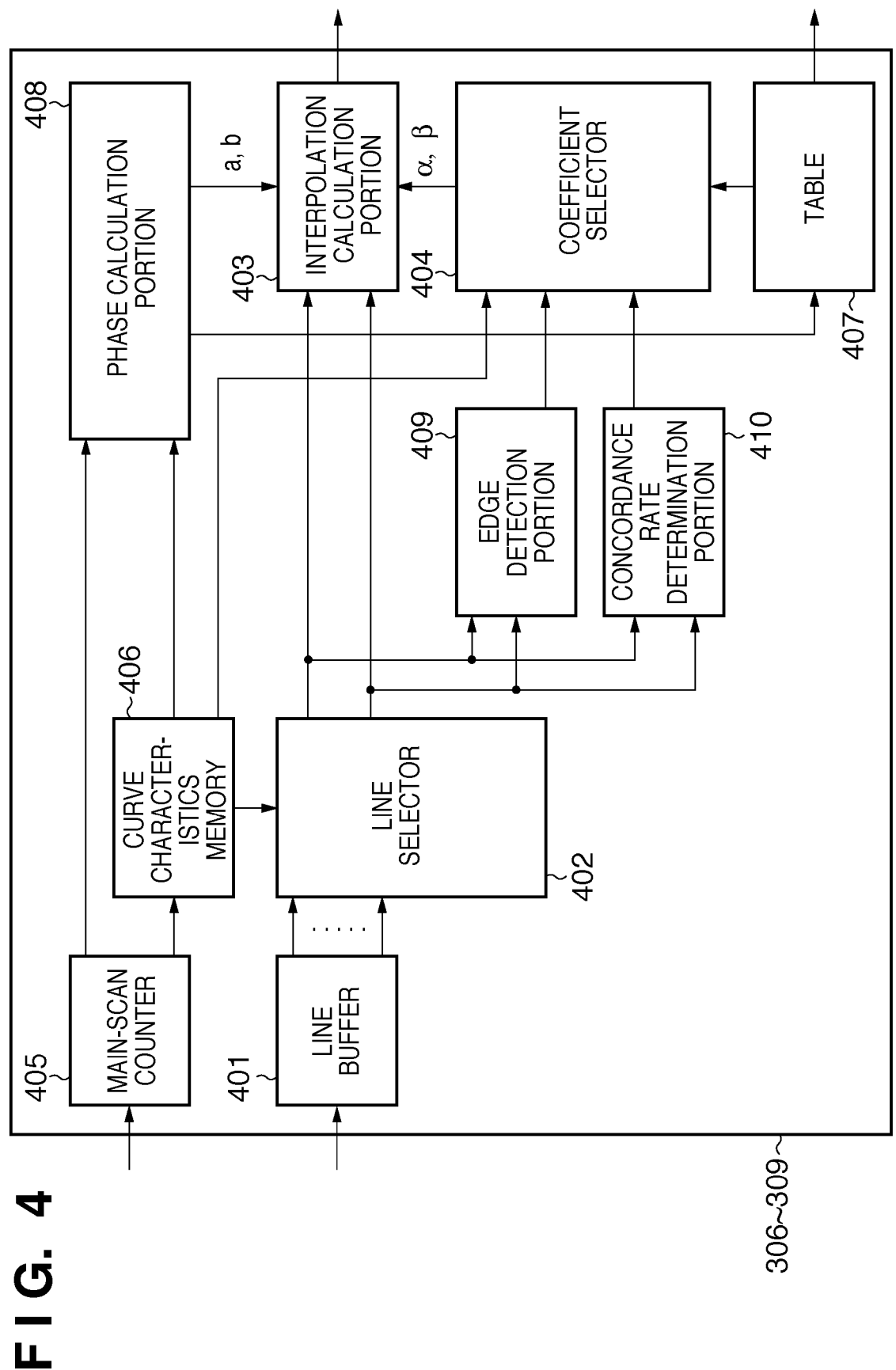
FIG. 4 is a block diagram showing one example of an output-related image processing portion according to the present embodiment.

FIG. 4 is a block diagram showing one example of an output-related image processing portion according to the present embodiment. A line buffer 401 is a storage device that stores pixel data corresponding to the number of lines to be used at a later stage by an interpolation calculation portion 403. For example, if a width of line shifting including manufacturing disparity is 20 lines at a maximum, then the line buffer 401 can hold pixel data for 21 lines. Having an extra line is necessary for calculation processes in interpolation processing. In the line buffer 401, each time the pixel data of one line is transferred, the pixel data of the transferred line is exchanged for a latest set of pixel data. For example, when pixel data of the first line has been transferred, the pixel data of the 22nd line is newly held in the line buffer 401. In this way, the line buffer 401 always holds the pixel data of the latest 21 lines.

A line selector 402 receives all the data held in the line buffer and selects a desired line for output. For example, the line selector 402 selects a line based on sub-scanning direction shift information that indicates a curve distortion that is read out from a curve characteristics memory 406. In this way, line replacement is achieved. In the present embodiment, since the interpolation calculation portion 403 is based on linear interpolation, the line selector 402 outputs pixel data of two lines including a group of pixels of interest.

Specifically, a line selection position is determined according to a function that produces an integer portion. When a curve characteristic is 10.5:

Int (10.5)=10, Int (10.5)+1=11 is output, thereby selecting the 10th and 11th line.

The interpolation calculation portion 403 is a block that executes an interpolation process for reducing curvature and a correction process for reducing jaggies. The interpolation calculation portion 403 is one example of an interpolation processing portion that, after the irradiated points of the irradiated light have been adjusted, outputs interpolated pixel data by performing interpolation calculations on pixel data of a group of pixels of interest constituted by one or more pixels.

A coefficient selector 404 is a block that outputs a coefficient for reducing jaggies to the interpolation calculation portion. For example, based on a detection result from an edge detection portion 409, a determination result from a concordance rate determination portion 410, and information of interpolation direction from the curve characteristics memory 406, the coefficient selector 404 generates and outputs coefficients $\alpha$ and $\beta$. The coefficients $\alpha$ and $\beta$ are one example of a second set of coefficients for correcting a first set of coefficients.

A main-scan counter 405 generates a timing signal that indicates a current main-scanning position and supplies this to the curve characteristics memory 406 and a phase calculation portion 408. It should be noted that the timing signal is used as a read out address in the curve characteristics memory 406. The main-scanning position is specified in a range of 0 to 8,191 for example Shift information stored in the curve characteristics memory 406 is, for example, information that indicates a section (number of pixels in the main scanning direction) in which interpolation is to be applied and a direction of interpolation (whether to shift up or to shift down).

A table 407 holds a plurality of tables capable of being read out and written to by the CPU 310. The table 407 outputs to the coefficient selector 404 information associated with phase information determined by the phase calculation portion 408. The table 407 is one example of a correction coefficient output portion that outputs the second set of coefficients to correct the first set of coefficients in accordance with a pattern recognition rate. The pattern recognition rate is referred to hereinafter as pattern concordance rate.

The phase calculation portion 408 determines a phase from shift information output from the curve characteristics memory 406 in response to the current main-scanning position output from the main-scan counter 405 and outputs the phase to the interpolation calculation portion 403. The phase corresponds to a curve characteristic fractional portion (=Frac (curve characteristic)). For example, if the smallest value of shift is zero, then the phase at this time is zero degrees. When the shift is 1, the phase is 360 degrees.

Accordingly, in the calculations of the present working example, if zero is assigned to zero degrees and 128 is assigned to 360 degrees, then the phase (Phase) is calculated based on the following formula.

Phase=128×Frac (curve characteristic)

For example, if a curve characteristic of a predetermined main-scanning position is 10.5, then the phase (Phase) is 64. It should be noted that the phase calculation is executed using decimal portion of Frac (10.5)=0.5. Also note that the phase calculation portion 408 is one example of a phase calculation portion that calculates a scanning line shift amount as phase information and, from the phase information, outputs the first set of coefficients to be supplied to the interpolation processing portion.

The edge detection portion 409 is a block that detects an edge from pixel data output from the line selector 402. The concordance rate determination portion 410 calculates a pattern concordance rate (Diff_abs) and outputs this to the coefficient selector 404. It should be noted that in addition to the pattern concordance rate, the concordance rate determination portion 410 may also output to the coefficient selector 404 a result of comparing the pattern concordance rate and a predetermined threshold value. The edge detection portion 409 or the concordance rate determination portion 410 is one example of a pattern recognition portion that performs pattern recognition on the density of peripheral pixels including the group of pixels of interest and outputs a pattern concordance rate.

Figure 5:
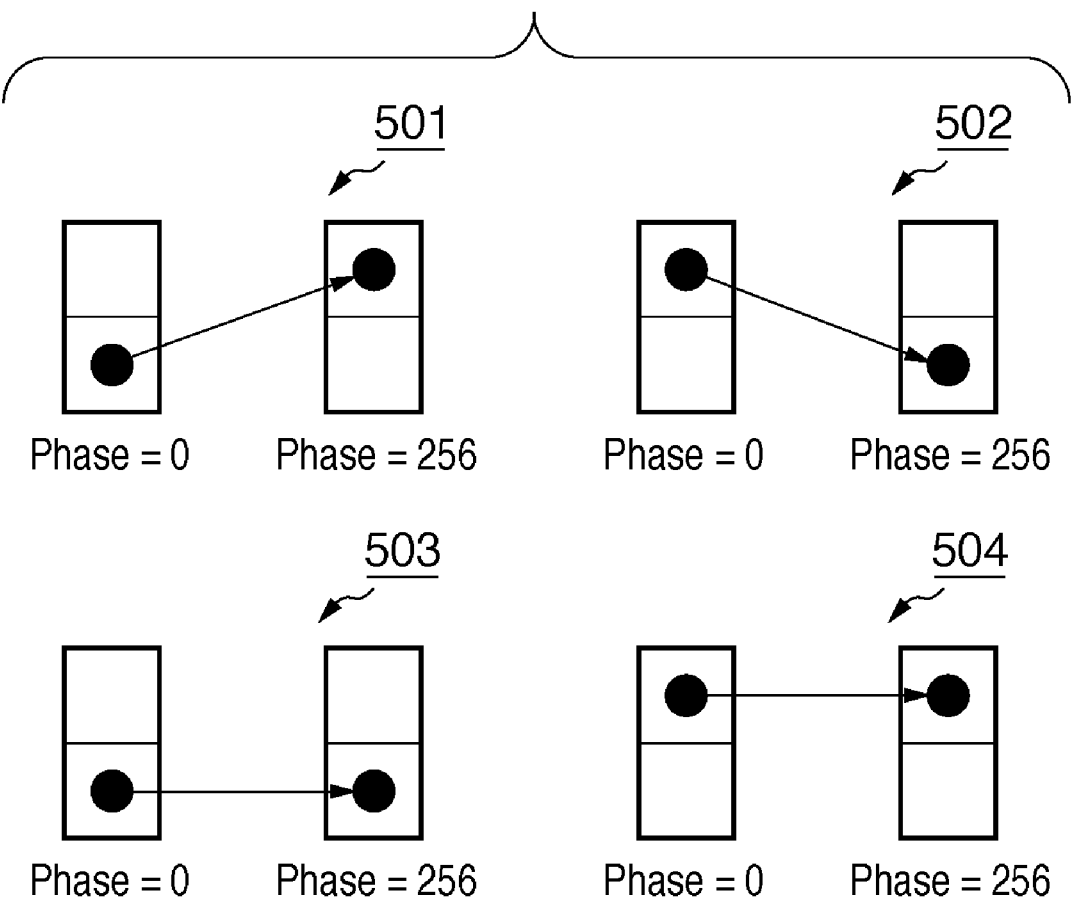
FIG. 5 is a diagram showing four types of instances corresponding to shift information.

FIG. 5 is a diagram showing examples of four types of instances corresponding to shift information. Instances 501 and 502 show two instances having different interpolation directions. In the two pixels lined up vertically in the instance 501, the density of the lower side pixel is Pxa and the density of the upper side pixel is Pxb. In the two pixels lined up vertically in the instance 502, the density of the upper side pixel is Pxa and the density of the lower side pixel is Pxb. Also, pixel data after interpolation is given as Px. The density of each pixel is expressed using 16 values for example. Instances 503 and 504 show instances for which interpolation (line replacement) is unnecessary. Accordingly, the values of the pixels of interest are output as they are to a later stage.

The phase calculation portion 408 is provided internally with a table for determining interpolation coefficients a and b. The phase calculation portion 408 determines the interpolation coefficients a and b by referring to the table based on the phase information (Phase) that is determined in response to the shift information. Accordingly, this table may also be referred to as an interpolation coefficient determination table.

The interpolation coefficients a and b are one example of the first set of coefficients and are 8-bit data for example. In the present embodiment, when $\alpha=\beta=0$, a and b are set so that the inter-pixel calculations are linear interpolation.

a=Table_a [Phase]

b=Table_b [Phase]

Here, Table_a [Phase] and Table_b [Phase] are interpolation coefficients when the phase is Phase, and are registered in advance in a table of the phase calculation portion 408. In this way, the interpolation coefficients are read out from the table by referring to the table using the phase. It should be noted that the table in the phase calculation portion 408 is capable of being read out and written to by the CPU 310. Also note that in the present embodiment this is a table, but a following formula may also be used. Due to this, the hardware configuration can be reduced without greatly harming image quality.

a=128−Phase b=Phase

The table 407 outputs two values corresponding to the phase (Phase) supplied from the phase calculation portion 408. The output values in this case are as follows:

Table_Dbk [Phase]

Table_Dwh [Phase]

These output values are stored associated with the phase in the table 407. As is described later, Table_Dbk [Phase] and Table_Dwh [Phase] are used by the coefficient selector 404 for determining or calculating the coefficients $\alpha$ and $\beta$.

Figure 6:
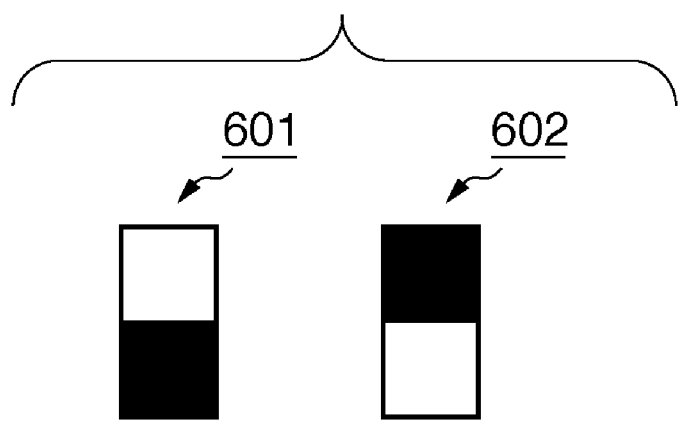
FIG. 6 is a diagram showing one example of two edge patterns to be detected by the edge detection portion.

FIG. 6 is a diagram showing one example of two edge patterns to be detected by the edge detection portion. Of course, other edge patterns may also be employed, but here the simplest and easiest to understand patterns are employed.

Edge patterns 601 and 602 are constituted by two pixels lined up in the sub-scanning direction. Here, the sets of pixel data (densities) of the two vertically lined up pixels are referred to as Pu and Pd respectively. The edge detection portion 409 compares Pu and Pd against the group of pixels of interest. If a result of the comparison is that it is established that Pu<Pd, then the edge pattern 601 is detected. On the other hand, if it is established that Pu>Pd, then the edge pattern 602 is detected. The edge detection portion 409 outputs as a detection result to the coefficient selector 404, identification information or the like for identifying the detected edge patterns. In this way, the edge detection portion 409 is one example of a detection portion that detects predetermined patterns in response to a magnitude relationship between values of two pixels.

The coefficient selector 404 recognizes the interpolation direction from the shift information for example, and generates the coefficients $\alpha$ and $\beta$ to be output to the interpolation calculation portion 403. For example, the coefficients $\alpha$ and $\beta$ are as follows when the interpolation direction is instance 501 and the edge pattern 601 has been detected, or when the interpolation direction is instance 502 and the edge pattern 602 has been detected.

$\alpha$=Table_*Dbk*[Phase]*Diff_abs/16

$\beta$=Table_*Dwh*[Phase]*Diff_abs/16

It should be noted that Table_Dbk [Phase] and Table_Dwh [Phase] are supplied from the table 407. Furthermore, Diff_abs is supplied from the concordance rate determination portion 410.

The coefficients $\alpha$ and $\beta$ are as follows when the instance 501 and the edge pattern 602 have been detected, or when the instance 502 and the edge pattern 601 have been detected.

$\alpha$=Table_*Dwh*[Phase]*Diff_abs/16

$\beta$=Table_*Dbk*[Phase]*Diff_abs/16

In this way, when a predetermined pattern has been detected, the table 407 and the coefficient selector 404 output table data obtained in response to the phase information from the table selected in response to the pattern concordance rate as the second set of coefficients. Furthermore, when a predetermined pattern has not been detected, the table 407 and the coefficient selector 404 output values (for example, zero) that do not affect the first set of coefficients as the second set of coefficients.

The concordance rate determination portion 410 calculates the Diff_abs (pattern concordance rate) based on the follow formula for example.

$$Diff\_abs = |Pu - Pd|$$

That is, Diff_abs is obtained as an absolute value of a difference between Pu and Pd. Further still, the concordance rate determination portion 410 may also compare the Diff_abs that is calculated with a predetermined threshold value Diff_th. For example, if the Diff_abs exceeds the threshold value Diff_th, then the concordance rate determination portion 410 determines that the edge pattern concords. In this way, the concordance rate determination portion 410 is one example of a calculation portion that calculates a difference between the values of two pixels and calculates absolute values of the difference as the pattern concordance rate.

The interpolation calculation portion 403 executes interpolation calculations in response to a determination result of the concordance rate determination portion 410. The determination result of the concordance rate determination portion 410 is passed to the interpolation calculation portion 403 indirectly from the concordance rate determination portion 410 via the coefficient selector 404, or passed directly from the concordance rate determination portion 410.

If Diff_abs>Diff_th, then the interpolation calculation portion 403 calculates pixel data Px after interpolation based on the following formula.

$$Px = (A \cdot Pxa + B \cdot Pxb + 64)/128$$

In the above formula, 128 is assigned when the multiplication coefficient A or B for the pixel is 1. Division by 128 achieves 7-bit shift calculations in the configuration of the present working example. Furthermore, 64 is an offset for rounding off, and here the coefficients A and B are expressed in a following manner using the aforementioned coefficients a, b, α, and β.

$$A = a + \alpha$$

$$B = b + \beta$$

In the present working example, a and b have a role as parameters of liner calculations, and α and β have a role as correction parameters for edge characteristics in terms of electrophotography. On the other hand, if Diff_abs≦Diff_th, then the interpolation calculation portion 403 calculates Px as α=β=0.

Figure 7:
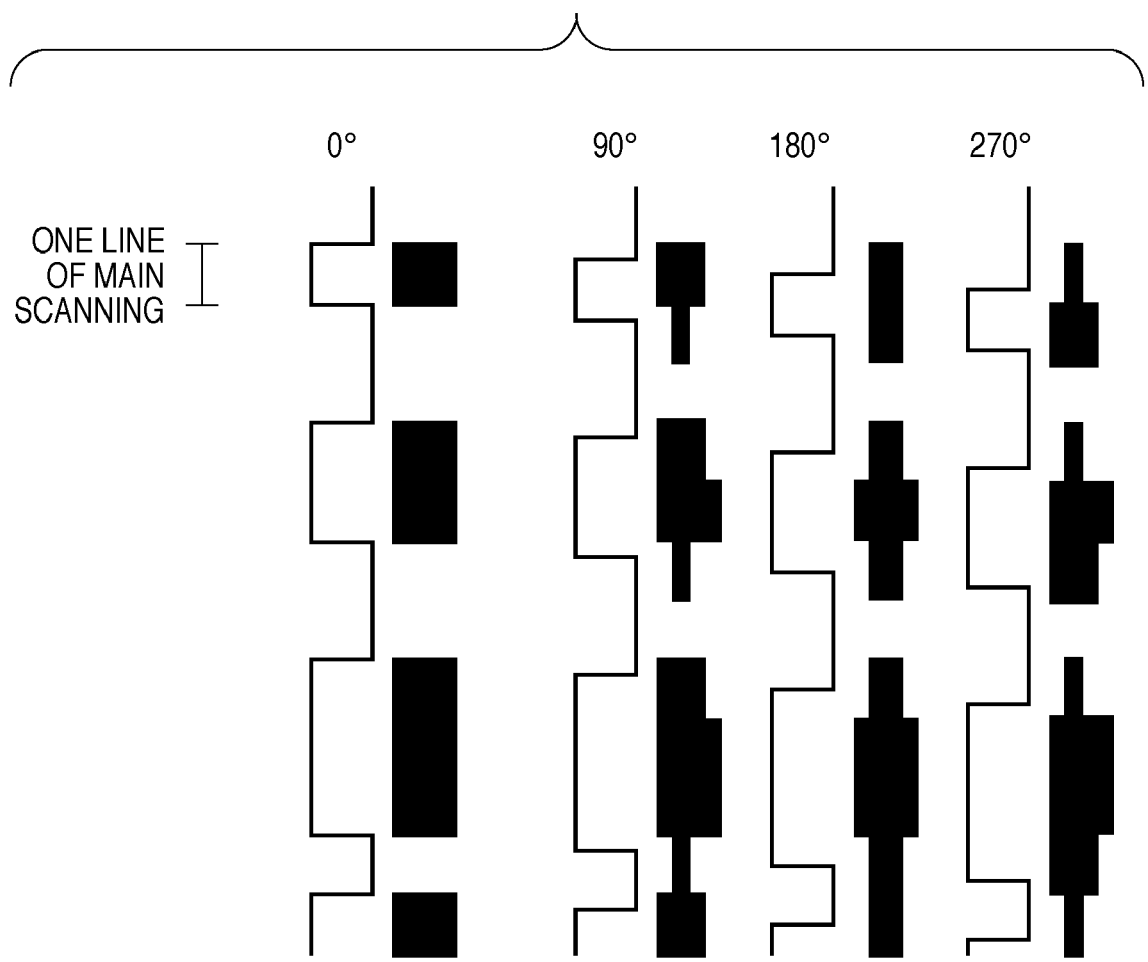
FIG. 7 is a diagram showing one example of PWM signals that have undergone interpolation processing.
Figure 8:
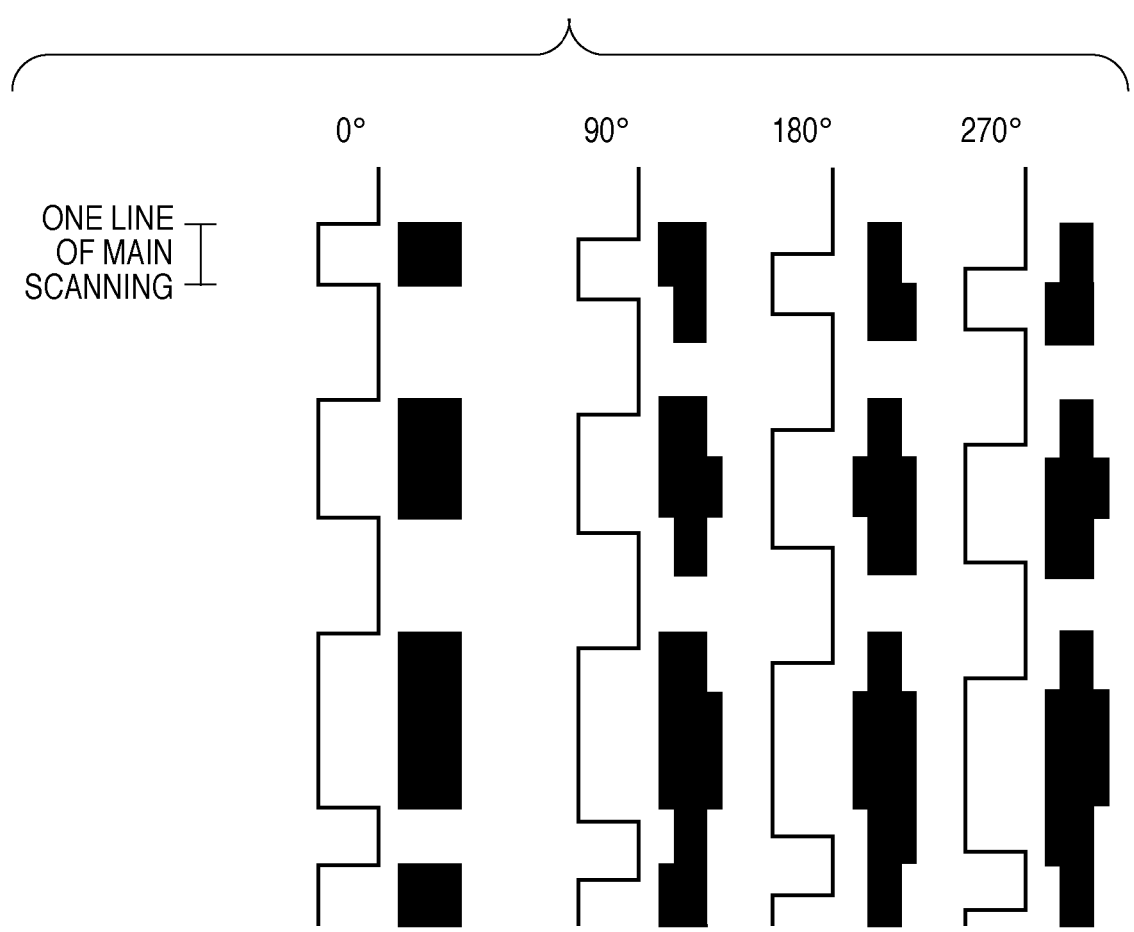
FIG. 8 is a diagram showing one example of PWM signals that have undergone interpolation processing.

FIG. 7 and FIG. 8 are a diagrams showing one example of PWM signals that have undergone interpolation processing. A vertical direction indicates a sub-scanning position and a left direction indicates density. In particular, FIG. 7 shows a combination of PWM patterns in a case where α=β=0 (zero degrees, 90 degrees, 180 degrees, and 270 degrees). Furthermore, FIG. 8 shows a state in which pixels have been corrected such that the width of edge portions is expanded using the coefficients α and β.

As shown in FIG. 7 and FIG. 8, with the present embodiment, correction can be performed on the curvature of scanning lines while maintaining the uniformity of fine lines by correcting shifts within a single line that can occur due to the correction.

Figure 9:
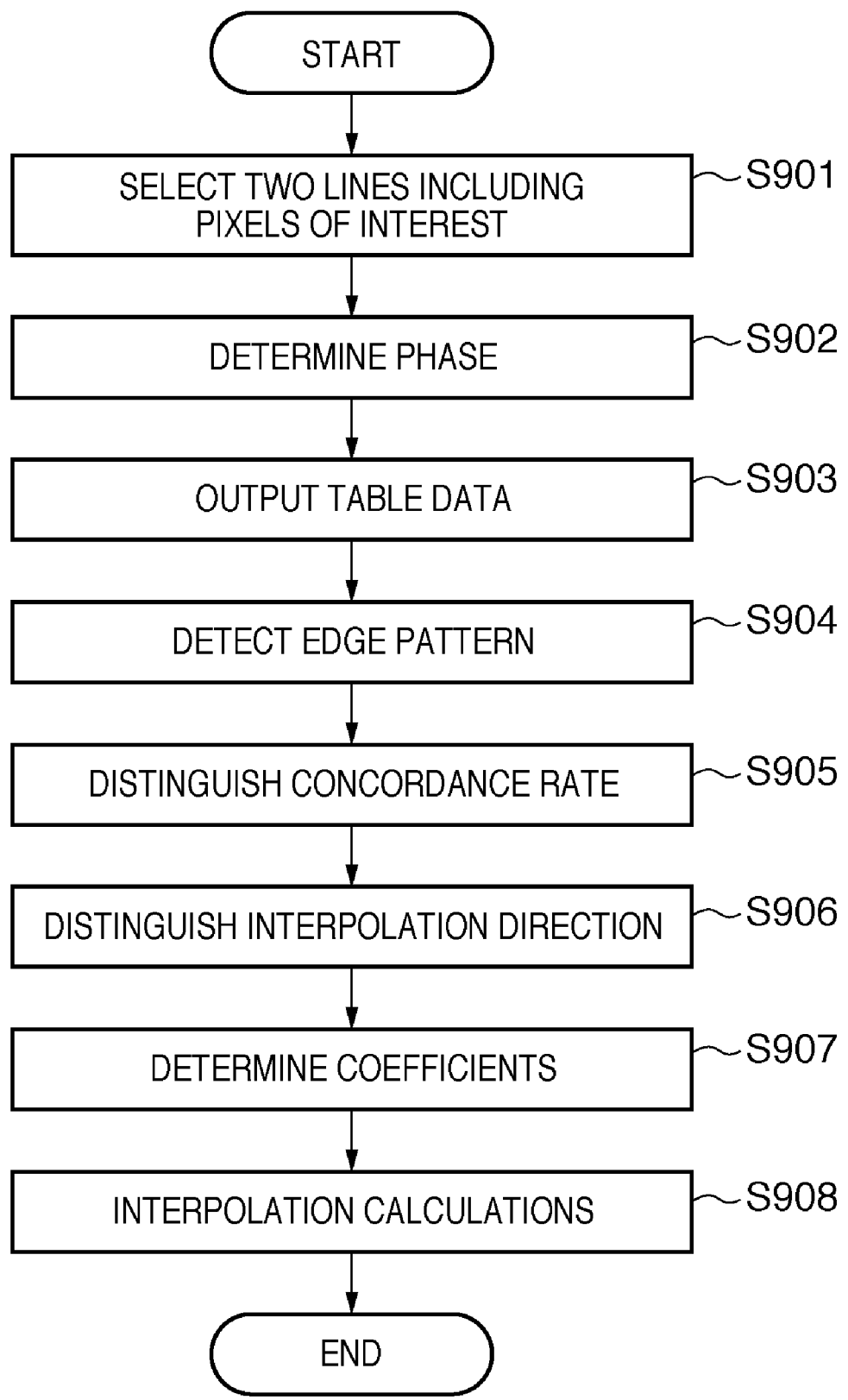
FIG. 9 is a flowchart showing one example of a correction method according to the present embodiment.

FIG. 9 is a flowchart showing one example of a correction method according to the present embodiment. In step S901, the line selector 402 selects two lines in accordance with the shift information and the pixel data thereof (line data) is output to a later stage.

In step S902, the phase calculation portion 408 determines the phases in accordance with the shift information and outputs the interpolation coefficients a and b corresponding to the phases to the interpolation calculation portion 403. It should be noted that phase information is also supplied to the table 407. In step S903, the table 407 outputs to the coefficient selector 404 the Table_Dwh [Phase] and/or Table_Dbk [Phase], which are table data corresponding to the supplied phases.

In step S904, the edge detection portion 409 detects for the edge patterns 601 and 602 in accordance with the line data and outputs a detection result to the coefficient selector 404. In step S905, the concordance rate determination portion 410 calculates the Diff_abs, which is a pattern concordance rate from the line data and outputs this to the coefficient selector 404. Also, the concordance rate determination portion 410 also outputs to the coefficient selector a result of comparing the pattern concordance rate and a threshold value.

In step S906, the coefficient selector 404 determines the interpolation direction in accordance with the shift information. In step S907, the coefficient selector 404 determines the coefficients α and β from the input table data, the detection results, the pattern concordance rate, and the interpolation direction and the like, and outputs this to the interpolation calculation portion 403. In step S908, the interpolation calculation portion 403 executes interpolation calculations based on such items as the interpolation coefficients a and b, the coefficients α and β, and the concordance rate comparison results. In this way, pixel data Px that has undergone interpolation in regard to pixels of interest is determined.

In regard to the processing from steps S903 to S907 in this flowchart, the sequence of execution may be changed as long as contradiction does not occur in the processing. Furthermore, the interpolation processing according to this flowchart is repetitively executed until interpolation is completed for all targeted pixels.

As described above, with the present embodiment, interpolation is executed giving consideration to the second set of coefficients α and β, which are related to the interpolation direction, and the pattern concordance rates, which involve the density near pixels of interest, using the interpolation coefficients a and b, which are the first set of coefficients dependent on scanning line shift. For this reason, it becomes possible to perform correction on the curvature of scanning lines while maintaining the uniformity of fine lines by correcting shifts within a single line that can occur due to the correction. That is, excellent image quality can be obtained even for images requiring the reproducibility of very small dots such as the edges of fine lines.

Furthermore, it is also possible to output the second set of coefficients by selecting a table corresponding to the calculated pattern concordance rate from a plurality of tables that have been prepared according to differences in pattern concordance rates and inputting phase information to the selected table. Since tables can generally be overwritten by the CPU 310, the second set of coefficients can be easily amended in response to conditions. Of course, a function may be employed instead of the tables. In this case, the hardware configuration can be further simplified.

Furthermore, in addition to detecting patterns determined in advance in response to a magnitude relationship of the values of two pixels adjacent in the sub-scanning direction, the absolute values of the difference between the values of the two pixels may also be calculated as the pattern concordance rate. Jaggies produced by line replacement are produced in the sub-scanning direction. Accordingly, focusing on pixels adjacent to each other in the sub-scanning direction is preferable since it improves the pattern recognition rate. Furthermore, by using two pixels for the pattern to be detected, the configuration for detecting patterns can be simplified.

Furthermore, it is also possible to select a table in response to the pattern concordance rate when a predetermined pattern is detected to obtain table data corresponding to the phase information from the selected table and to output this as the second set of coefficients. It should be noted that when a predetermined pattern has not been detected, it is possible to output values as the second set of coefficients that do not affect the first set of coefficients. Especially when a predetermined pattern has not been detected, this signifies that jaggies will tend not to become a problem. Accordingly, by outputting values that do not affect the first set of coefficients as the second set of coefficients, it is possible to prohibit the first set of coefficients, which are the interpolation coefficients, from being excessively corrected.

In addition to the group of pixels of interest including two or more pixels adjacent to each other in the sub-scanning direction, the group of pixels of interest may also include two or more pixels adjacent to each other in the main scanning direction. Details of this are described in embodiment 2, but in this case, it is considered that including pixels adjacent to each other in the main scanning direction with respect to the pixels of interest improves the accuracy of correction for the interpolation coefficients. This is because an amount of information for corrections is increased.

Figure 10:
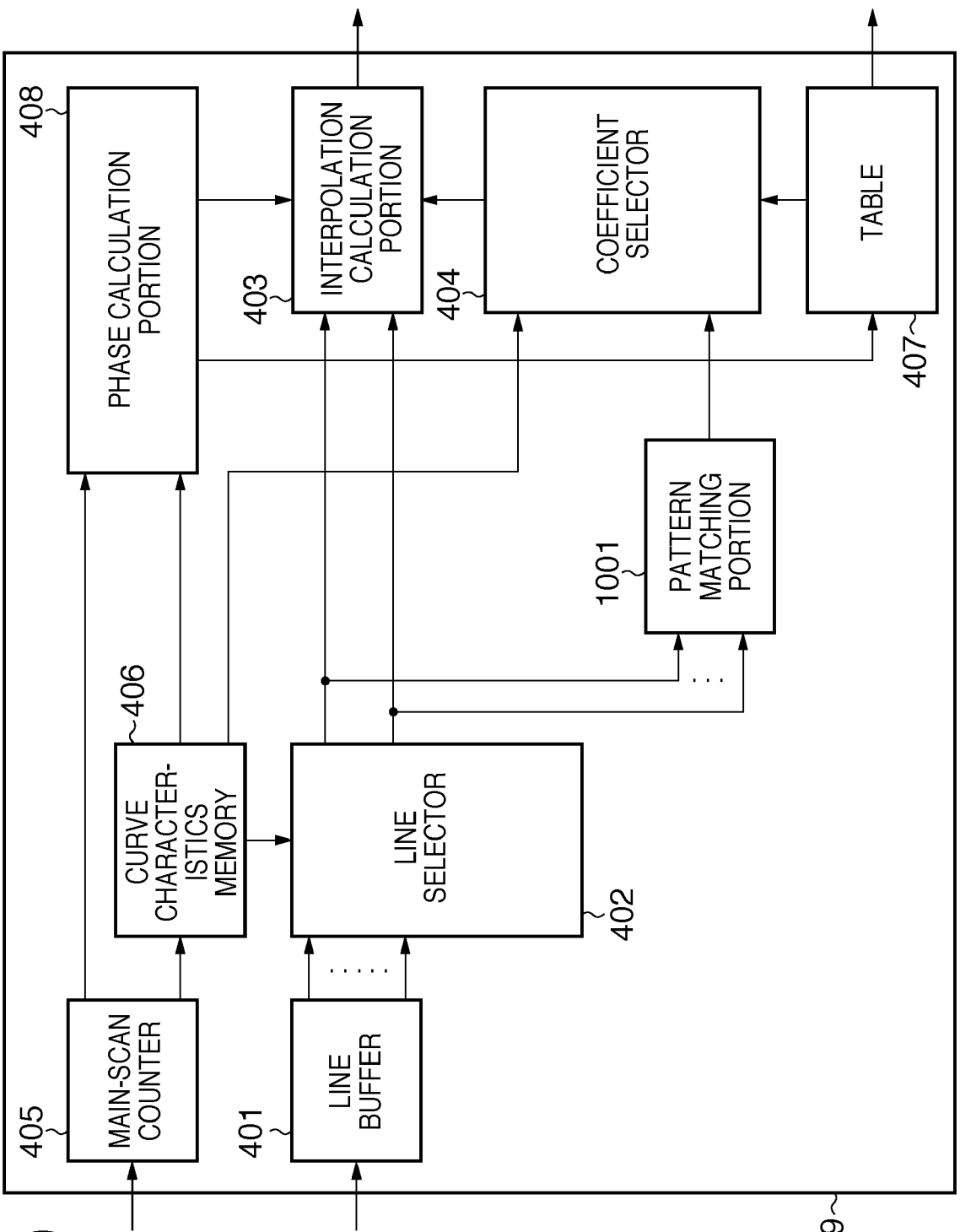
FIG. 10 is a block diagram showing one example of an output-related image processing portion according to the present embodiment.

FIG. 10 is a block diagram showing one example of an output-related image processing portion according to the present embodiment. Embodiment 2 is a modified example of the previous embodiment (hereinafter, referred to as "embodiment 1"). Although the fundamental operations in both of these are the same, the edge detection portion 409 and the concordance rate determination portion 410 in embodiment 1 are replaced by a pattern matching portion 1001. Furthermore, the table 407 holds table data corresponding to the number of patterns that can be recognized by the pattern matching portion 1001. The pattern matching portion 1001 is also one example of the aforementioned pattern recognition portion.

The pattern matching portion 1001 executes pattern matching of predetermined matching patterns for the group of pixels of interest. For example, if the group of pixels of interest is two pixels adjacent to each other in the sub-scanning direction, the pattern matching portion 1001 refers to from the line data three pixels lined up in the main scanning direction and four pixels lined up in the sub-scanning direction surrounding the group of pixels of interest. A 3×4 rectangular region such as this is referred to as a reference region. In this way, in addition to the group of pixels of interest including two or more pixels adjacent to each other in the sub-scanning direction, the group of pixels of interest may also include two or more pixels adjacent to each other in the main scanning direction.

Figure 11A:
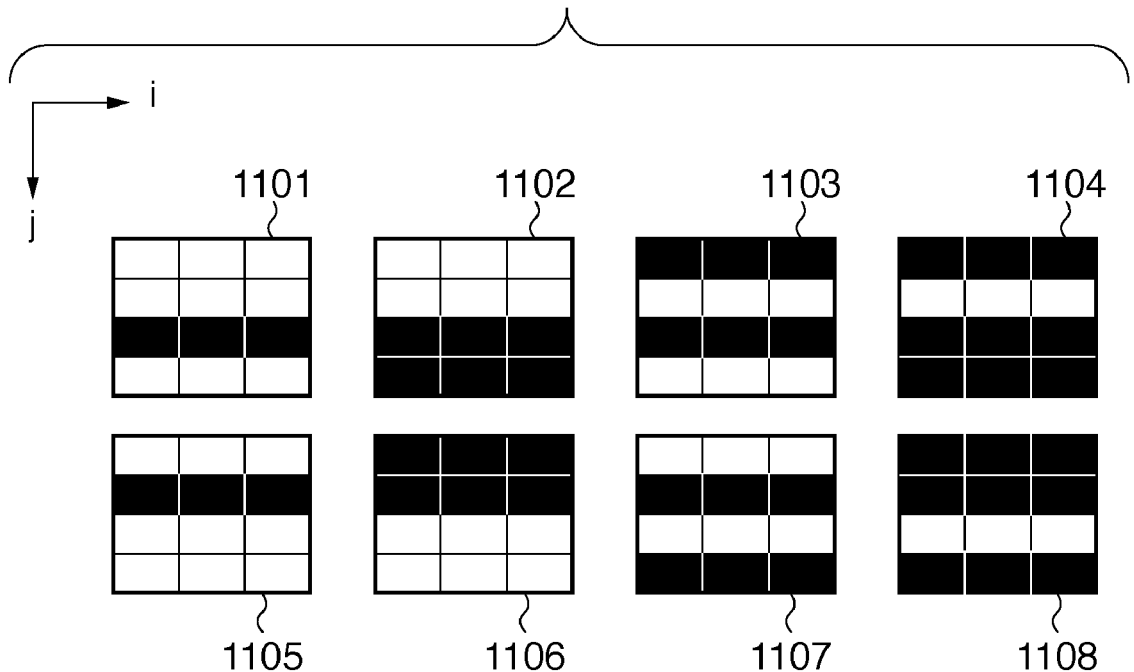
FIG. 11A is a diagram showing single examples of matching patterns according to the present embodiment.
Figure 11B:
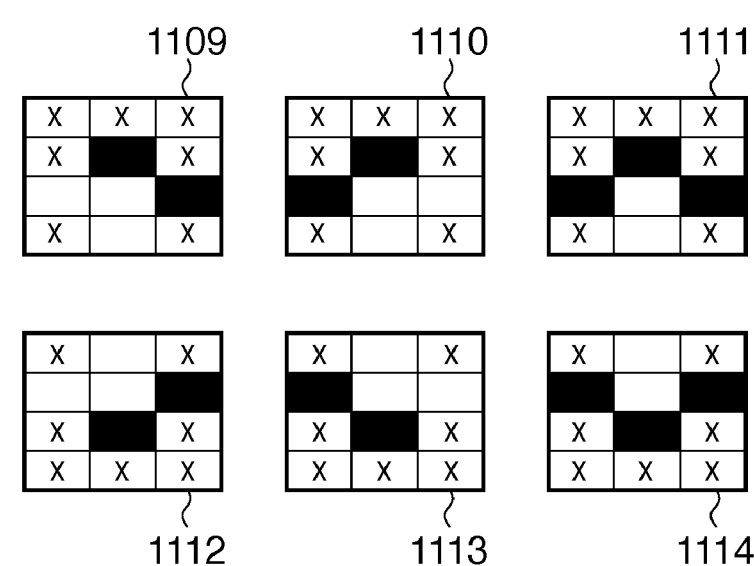
FIG. 11B is a diagram showing single examples of matching patterns according to the present embodiment.

FIG. 11A and FIG. 11B are diagrams showing single examples of matching patterns according to the present embodiment. FIG. 11A shows eight matching patterns 1101 to 1108. Furthermore, FIG. 11B shows a remaining six matching patterns 1109 to 1114. Pnij shows elements in which i is a main-scanning position and j is a sub-scanning position in an n-th matching pattern. The letter n is a matching pattern identification number and, in FIG. 11A, is assigned 1 to 4 for the patterns left to right on the upper level and assigned 5 to 8 for the patterns left to right on the lower level. Further still, in FIG. 11B, n is 9 to 11 for the patterns left to right on the upper level and n is 12 to 14 for the patterns left to right on the lower level.

In FIGS. 11A and 11B, i indicates the main-scanning position and j indicates the sub-scanning position. The value of the elements Pnij of the matching pattern is 1 if the element is shown black, −1 if shown white, and zero if shown as x. In this way, Pnij serves a role as one type of mask value. Accordingly, the matching patterns may also be called mask patterns.

Figure 12:
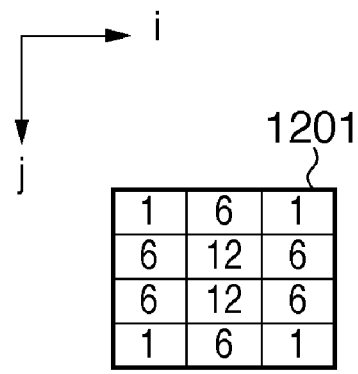
FIG. 12 is a diagram showing one example of a weighted pattern.

FIG. 12 is a diagram showing one example of a weighted pattern. An arrangement of elements in a weighted pattern 1201 is in agreement with the arrangement of elements in the matching patterns. In the present embodiment, the pattern matching portion 1001 calculates a pattern concordance rate (Match [n]) from the matching pattern and the weighted pattern. Here, when Wij is the weighted pattern element and the density of the pixel of interest is Pxij, Match [n] can be expressed by the following formula:

$$\text{Match}[n]=\Sigma(Pxij-8)*Wij*Pnij$$

In this way, the pattern matching portion 1001 calculates the pattern concordance rate by multiplying the pixel data that indicates the density of each pixel contained in the group of pixels of interest, the plurality of predetermined mask values, and the plurality of predetermined weighted coefficients.

Figure 13:
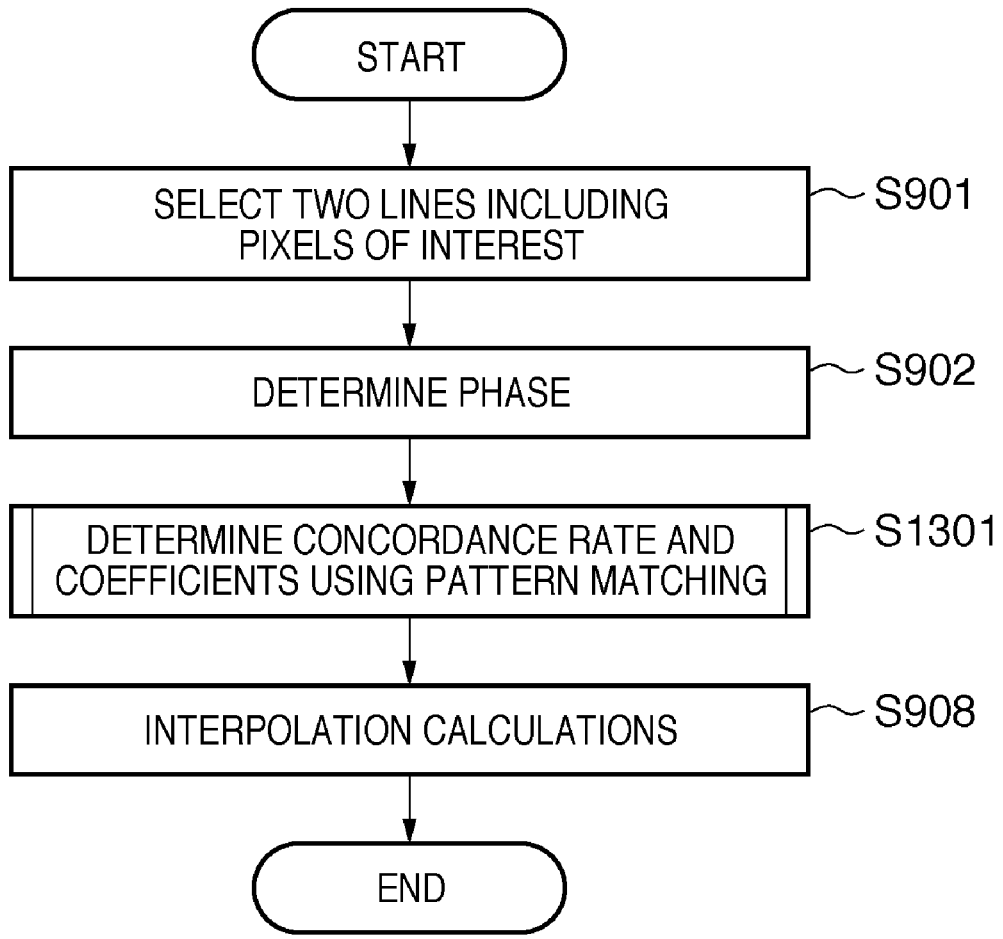
FIG. 13 is a flowchart showing one example of a correction method according to the present embodiment.

FIG. 13 is a flowchart showing one example of a correction method according to the present embodiment. Compared to FIG. 9, steps S903 to S907 are replaced by step S1301. In step S1301, the pattern matching portion 1001 executes pattern matching, calculates the concordance rate, and passes this on to the coefficient selector 404.

Figure 14:
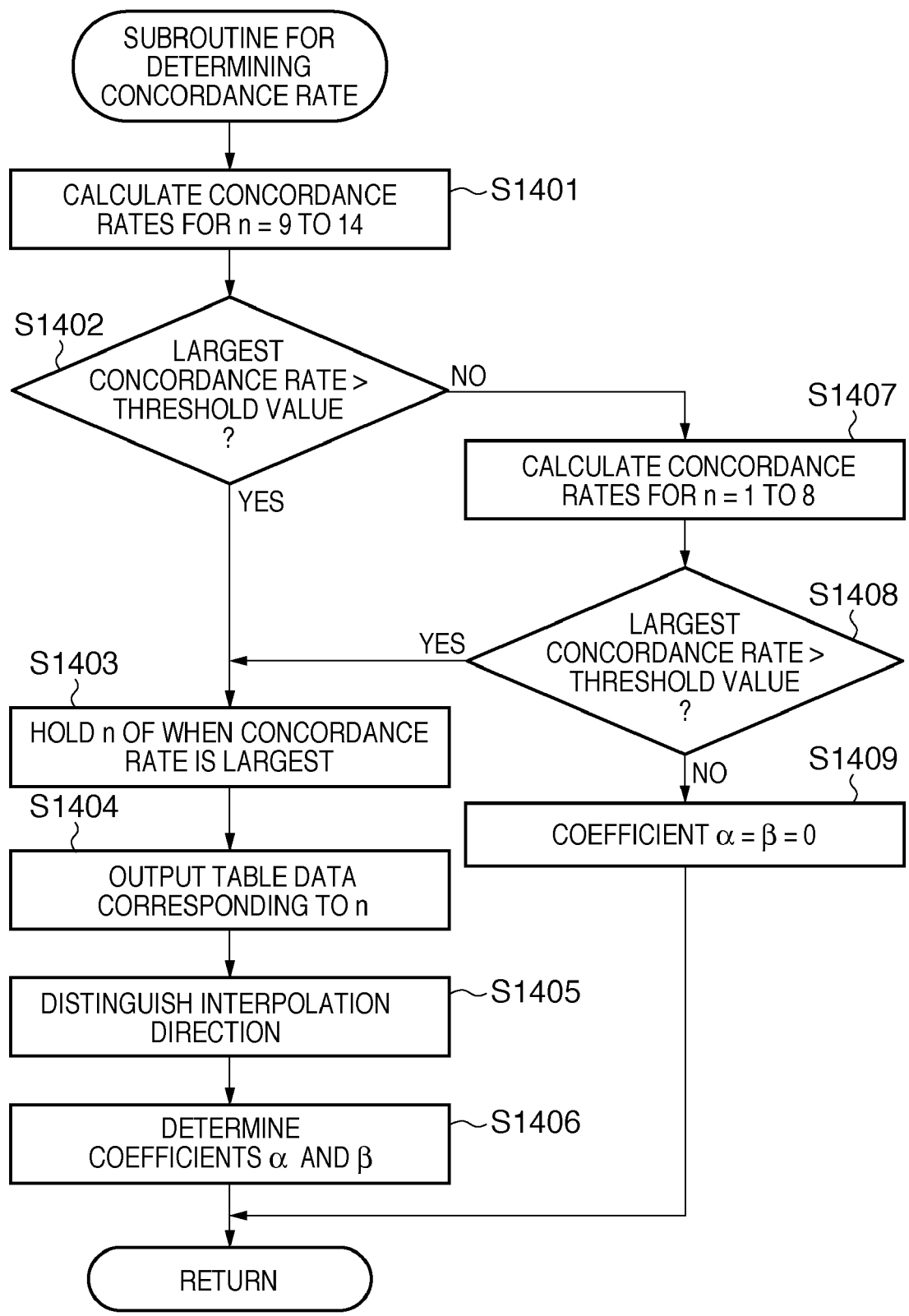
FIG. 14 is a flowchart showing one example of a method for determining a pattern concordance rate and various coefficients according to the present embodiment.
Figure 16:
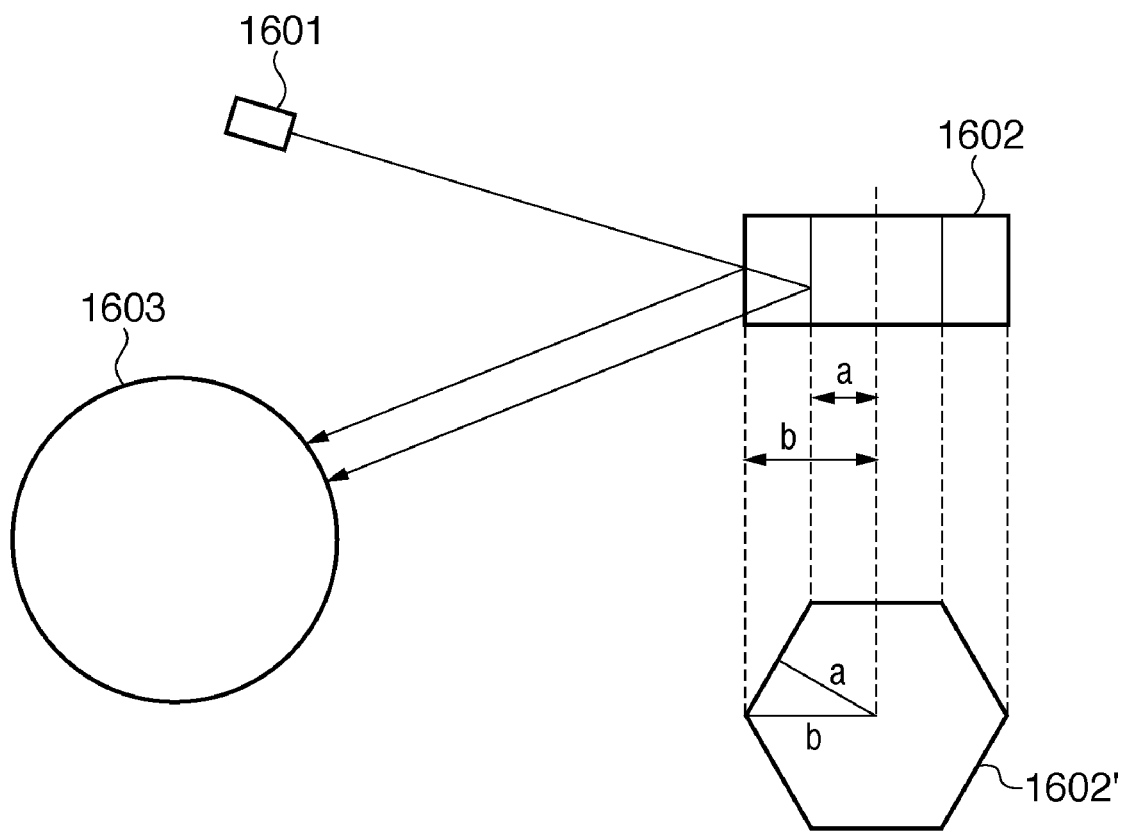
FIG. 16 is a lateral view showing one example of an oblique incidence type system.
Figure 17:
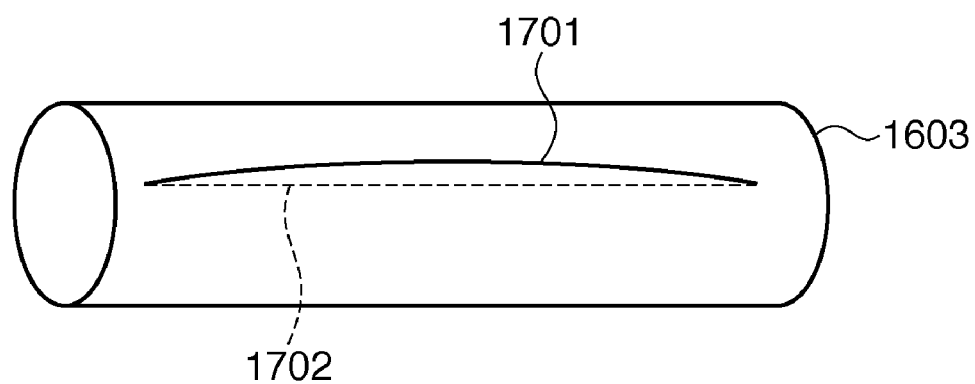
FIG. 17 is a diagram for describing a difference between an actual scanning line formed on a photosensitive drum 1603 using an oblique incidence type system, and an ideal scanning line.
Figure 18A:
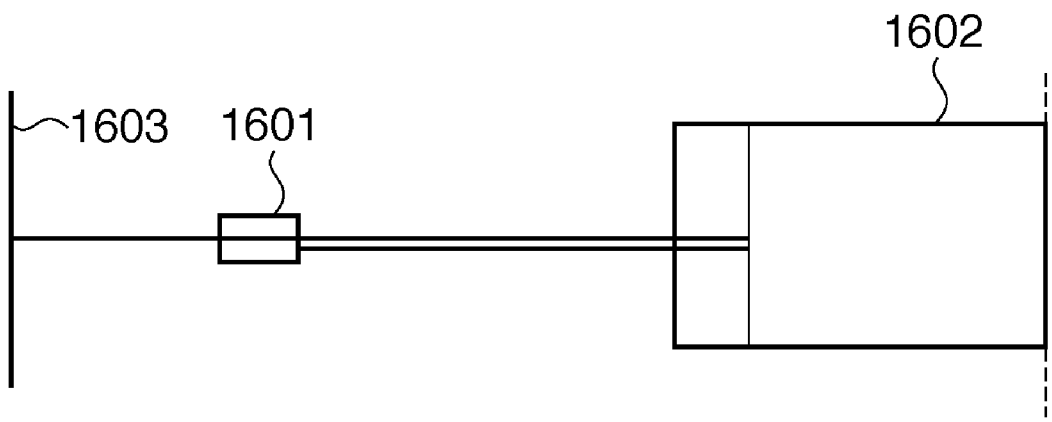
FIG. 18A is a diagram showing a single example of an ideal optical system in which there is no significant shift in the rotational axis.
Figure 18B:
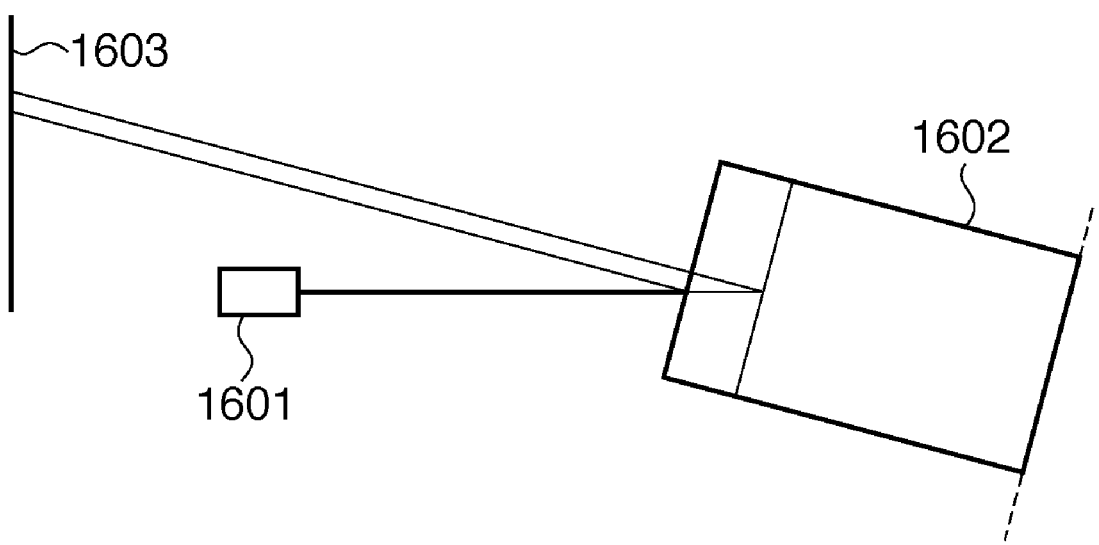
FIG. 18B is a diagram showing a single example of an actual optical system in which there is significant shift in the rotational axis.
Figure 19:
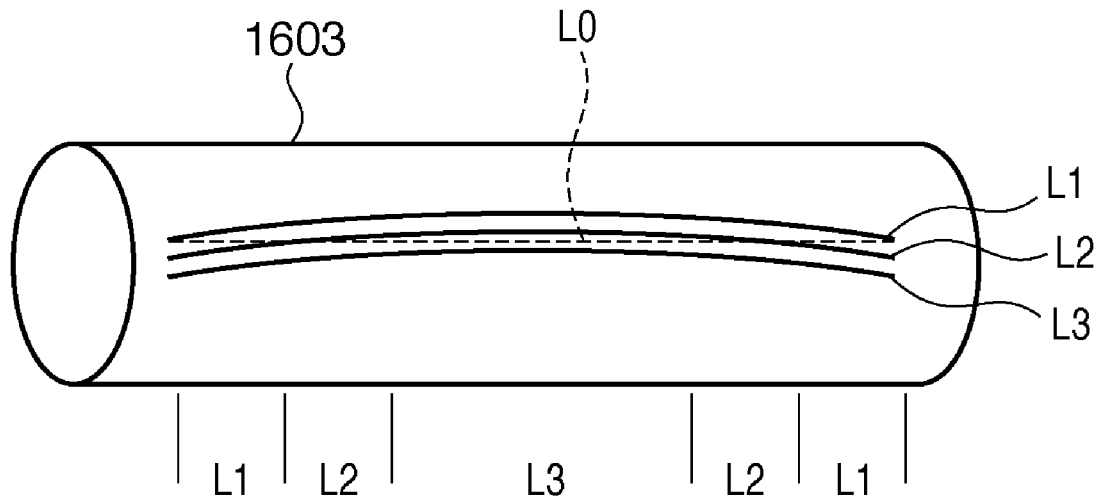
FIG. 19 is a diagram showing one example of a method for correcting curvature due to line replacement.
Figure 20:
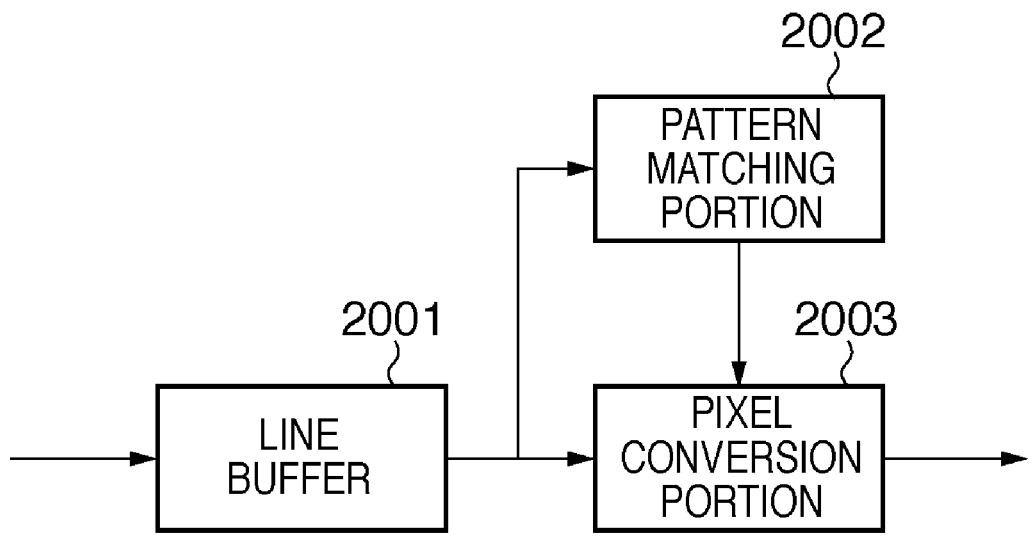
FIG. 20 is a block diagram of a smoothing process circuit according to related art.
Figure 21:
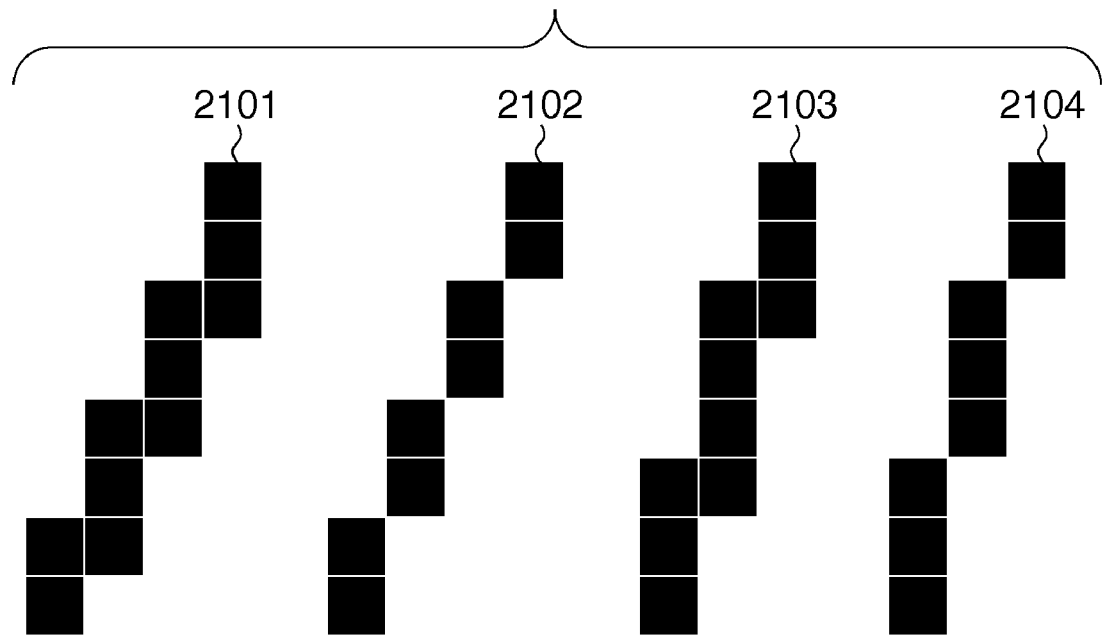
FIG. 21 is a diagram showing one example of patterns used in matching.
Figure 22:
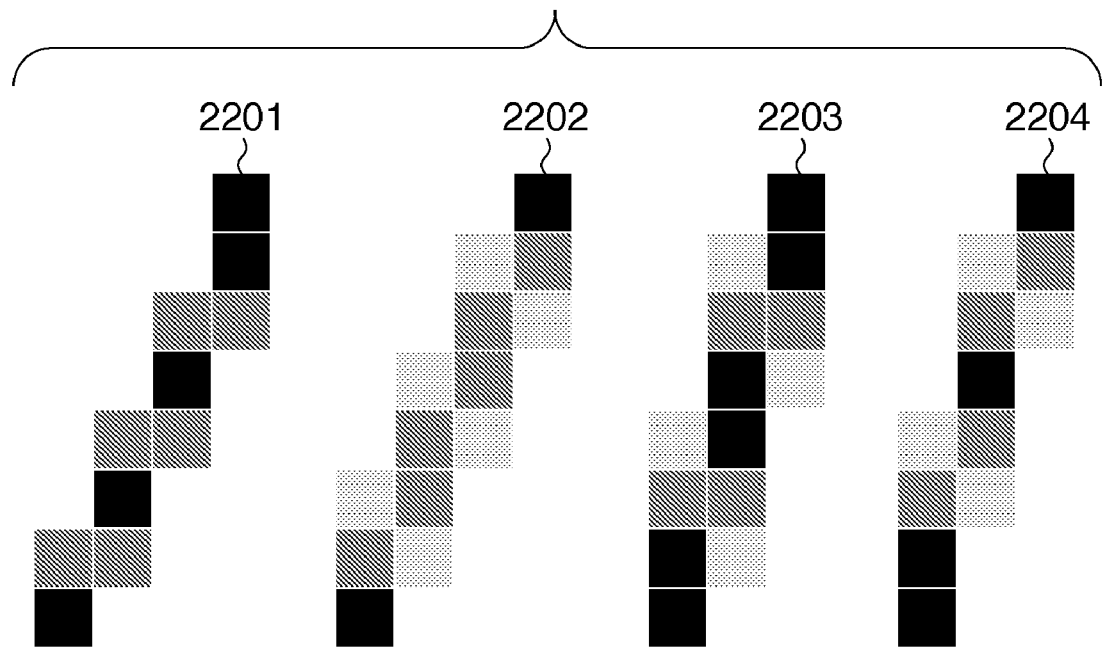
FIG. 22 is a diagram showing one example of pixel data that has been replaced by a smoothing process.
Figure 23:
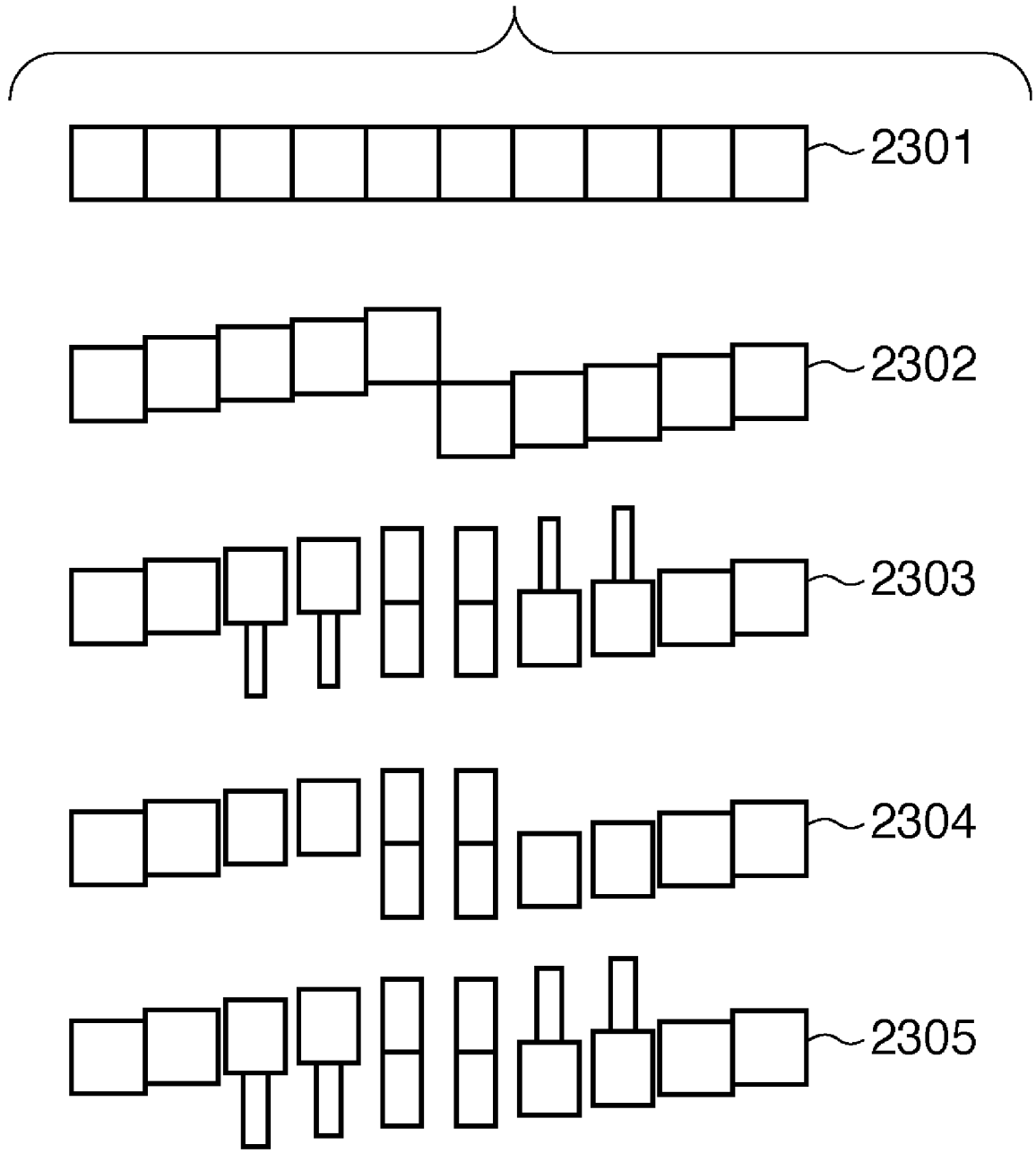
FIG. 23 is a diagram for describing the difficulty of maintaining uniformity in the thickness of fine lines.

FIG. 14 is a flowchart showing one example of a method for determining a pattern concordance rate and various coefficients according to the present embodiment. This flowchart shows step S1301 as a subroutine.

In step S1401, the pattern matching portion 1001 calculates a pattern concordance rate (Match [n]) for n=9 to 14 (matching patterns shown in FIG. 11B) respectively. In step S1402, the pattern matching portion 1001 compares the calculated pattern concordance rates, determines the pattern concordance rate thereof that is largest, then determines whether or not the pattern concordance rate that has been determined to be largest exceeds a predetermined first threshold value. If the threshold value is exceeded (YES in step S1402), the procedure proceeds to step S1403. If the threshold value is not exceeded (NO in step S1402), the procedure proceeds to step S1407.

In step S1403, the pattern matching portion 1001 holds the value of n having the largest pattern concordance rate. In step S1404, the pattern matching portion 1001 outputs n, which is being held, to the coefficient selector 404, then the coefficient selector 404 reads out from the table 407 the table data corresponding to the received n. Here, the value of the phase received from the phase calculation portion 408 is also given consideration. That is, the table 407 outputs table data Table_Nwh [Phase] and Table_Nbk [Phase] corresponding to n. In this way, the table 407 is a plurality of tables that have been prepared in accordance with the pattern concordance rates. Furthermore, a table corresponding to the pattern concordance rate from among the plurality of tables is selected and phase information is input to the selected table, thereby outputting the second set of coefficients.

In step 1405, the coefficient selector 404 determines the interpolation direction in accordance with the shift information. In step S1406, the coefficient selector 404 determines the coefficients α and β from the input table data, the identification number n, and the interpolation direction and the like, and outputs this to the interpolation calculation portion 403.

For example, when the interpolation direction is the instance 501 and the identification number n is 1 to 4 or 12 to 14, or when the interpolation direction is the instance 502 and the identification number n is 5 to 8 or 9 to 11, the coefficients α and β are determined using the following formulas:

$$\alpha = \text{Table\_}Dbk[\text{Phase}]*\text{Diff\_abs}/16$$

$$\beta = \text{Table\_}Dwh[\text{Phase}]*\text{Diff\_abs}/16$$

On the other hand, when the interpolation direction is the instance 501 and the identification number n is 5 to 8 or 9 to 11, or when the interpolation direction is the instance 502 and n is 1 to 4 or 12 to 14, the coefficients α and β are determined using the following formulas:

$$\alpha = \text{Table\_}Dwh[\text{Phase}]*\text{Diff\_abs}/16$$

$$\beta = \text{Table\_}Dbk[\text{Phase}]*\text{Diff\_abs}/16$$

Incidentally, when the largest pattern concordance rate does not exceed the first threshold value in step S1402, the procedure proceeds to step S1407. In step S1407, the pattern matching portion 1001 calculates a pattern concordance rate (Match [n]) for n=1 to 8 (matching patterns shown in FIG. 11A) respectively. In step S1408, the pattern matching portion 1001 compares the calculated pattern concordance rates, determines the pattern concordance rate thereof that is largest, then determines whether or not the pattern concordance rate that has been determined to be largest exceeds a predetermined second threshold value. If it exceeds the second threshold value (YES in step S1408), then the procedure proceeds to step S1403, and steps S1403 to S1406 are executed. If the second threshold value is not exceeded (NO in step S1408), the procedure proceeds to step S1409.

In step S1409, the pattern matching portion 1001 outputs to the coefficient selector 404 information indicating that an identification number n that meets conditions could not be determined. For example, the value of n may be set to a special value such as 99 as the information indicating that an identification number n could not be determined. Upon receiving information indicating that an identification number n could not be determined, the coefficient selector 404 sets coefficient α=β=0.

In the present embodiment, in regard to another matching pattern n' (for example, n=1, n'=5) that is line symmetric in the sub-scanning direction to the n-th matching pattern, table data TableNwh and TableNbk are extracted from the same tables.

Accordingly, this has the advantage that the number of tables can be reduced by half.

FIG. 15 is a diagram showing one example of PWM signals that have undergone interpolation processing. A vertical direction indicates a sub-scanning position and a left direction indicates density. In particular, FIG. 15 shows a case in which α=β=0. Here, FIG. 15 is compared against FIG. 8. Attention is given to a black→white→black change in a lower area of the diagram. In FIG. 8 there is a tendency for black to be filled, but in FIG. 15, the black filling is reduced since the accuracy of pattern matching is improved.

In this way, with embodiment 2, correction can be performed on the curvature of scanning lines while maintaining the uniformity of fine lines by correcting shifts within a single line that can occur due to the correction. In particular, even in images in which the reproducibility of edge portions in fine lines tends to be affected easily, jaggies due to interpolation processing are reduced. For example, since the pattern concordance rate is determined by obtaining a correlation between a matching pattern (mask pattern) and an image, it is considered that the accuracy of the pattern concordance rate is improved. For example, it is possible to calculate the pattern concordance rate by multiplying the pixel data that indicates the density of each pixel contained in the group of pixels of interest, the plurality of predetermined mask values, and the plurality of predetermined weighted coefficients. In particular, by optimizing the weightings experientially, the accuracy of calculating the pattern concordance rates can be improved.

In the embodiments according to the present invention, linear interpolation was described as one example of interpolation processing. However, this is merely one example. For example, in a range allowed by the scale of the hardware, a bicubic interpolation process or another interpolation process having excellent filtering characteristics may be employed.

In the present embodiment, a polygonal mirror was used as the scanning portion of the optical system. However, this is also merely one example. Other scanning portions may be employed such as a galvanic mirror or an EO (electro-optic device). This is because the present invention can be applied regardless of the type of scanning portion.

It is noted that the threshold values and the like described above are capable of being varied for each image forming apparatus in which they are to be actually used. Accordingly, optimized threshold values may be determined experientially so as to obtain the effect of the present invention for each image forming apparatus in which they are to be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-045100, filed Feb. 26, 2008 which is hereby incorporated by reference herein in its entirety.

What is claimed is:

1. An image forming apparatus, comprising:
   a scanning portion that deflects a light irradiated in accordance with output pixel data of interest in a main scanning direction to form an image on a photosensitive member;
   a read out portion that reads out a plurality of pixel data whose sub scanning positions are different each other, based on a curve characteristic corresponding to a main scanning position of the output pixel data of interest so as to correct shift of a scanning line by the light, the curve characteristic corresponding to the amount of shift of the scanning line in a sub scanning direction;
   an interpolation processing portion that interpolates the plurality of pixel data to generate the output pixel data of interest;
   a calculation portion that determines a first coefficient based on the curve characteristic;
   a pattern recognition portion that performs pattern recognition on the plurality of pixel data to output a pattern recognition rate; and
   a correction coefficient output portion that outputs a second coefficient in accordance with the pattern recognition rate,
   wherein the interpolation processing portion interpolates the plurality of pixel data based on the first and the second coefficients to generate the output pixel data of interest.

2. The image forming apparatus according to claim 1, wherein the plurality of pixel data is pixel data of two pixels adjacent to each other in the sub-scanning direction, and wherein the pattern recognition portion includes:
   a detection portion that detects edge based on the pixel data of the two pixels; and a difference calculation portion that calculates a difference between the pixel data of the two pixels and outputs the pattern recognition rate, wherein the correction coefficient output portion determines the second coefficient using the detection result, the pattern recognition rate, and a phase information based on the curve characteristic.

3. The image forming apparatus according to claim 1, wherein the plurality of pixel data includes pixel data of two or more pixels adjacent to each other in the sub-scanning direction and two or more pixels adjacent to each other in the main scanning direction.

4. The image forming apparatus according to claim 1, wherein the pattern recognition portion calculates the pattern recognition rate by multiplying pixel data that indicates a density of each of the plurality of pixel data, a plurality of predetermined mask values, and a plurality of predetermined weighted coefficients.

5. A control method utilized in an image forming apparatus comprising the steps of:

deflecting a light irradiated in accordance with output pixel data of interest in a main scanning direction to form an image on a photosensitive member;

reading out a plurality of pixel data whose sub scanning positions are different each other, based on a curve characteristic corresponding to a main scanning position of the output pixel data of interest so as to correct shift of a scanning line by the light, the curve characteristic corresponding to the amount of shift of the scanning line in a sub scanning direction;

interpolating the plurality of pixel data to generate the output pixel data of interest;

determining a first coefficient based on the curve characteristic;

performing pattern recognition on the plurality of pixel data to output a pattern recognition rate; and outputting a second coefficients in accordance with the pattern recognition rate, wherein the step of interpolating including interpolating the plurality of pixel data based on the first and the second coefficient to generate the output pixel data of interest.

6. An image forming apparatus, comprising:

a scanning portion configured to deflect a light irradiated in accordance with output pixel data of interest in a main scanning direction to form an image on a photosensitive member;

a read out portion configured to read out a plurality of pixel data whose sub scanning positions are different each other, based on a curve characteristic corresponding to a main scanning position of the output pixel data of interest so as to correct shift of scanning line by the light, the curve characteristic indicating the amount of shift of the scanning lines in a sub scanning direction;

a detection portion configured to detect edge information using the plurality of pixel data, the edge information including information indicating a direction of an edge and information indicating a degree of the edge; and an interpolation portion configured to interpolates the plurality of pixel data based on the detected edge information and phase information corresponding to the curve characteristic corresponding to the main scanning position of the output pixel data of interest, and to generate the output pixel data of interest.

7. The image forming apparatus according to claim 6, wherein the phase information belongs to a decimal part of the amount of the shift of the scanning line by the light in the sub scanning direction, and wherein the sub scanning positions of the plurality of pixel data read out by the read out portion are based on an integer part of the amount of the shift of the scanning line by the light in the sub scanning direction.

8. The image forming apparatus according to claim 6, wherein the detection portion performs a pattern matching.

* * * * *